(12) United States Patent
Christie et al.

(10) Patent No.: US 11,419,359 B1
(45) Date of Patent: *Aug. 23, 2022

(54) COOKING EXTRUSION HORN

(71) Applicant: Tyson Foods, Inc., Springdale, AR (US)

(72) Inventors: Mark Christie, Fayetteville, AR (US); Anthony J. Cardarelli, Rogers, AR (US); Dejing Fu, Lisle, IL (US); James A. Ruff, Farmington, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/913,108

(22) Filed: Jun. 26, 2020

Related U.S. Application Data

(60) Division of application No. 16/912,998, filed on Jun. 26, 2020, which is a continuation-in-part of application No. 16/532,038, filed on Aug. 5, 2019, now Pat. No. 10,694,773, which is a division of application No. 15/042,689, filed on Feb. 12, 2016, now Pat. No. 10,368,572.

(51) Int. Cl.

| | |
|---|---|
| A23P 30/20 | (2016.01) |
| A22C 7/00 | (2006.01) |
| B29C 48/30 | (2019.01) |
| A22C 11/02 | (2006.01) |
| B29C 48/00 | (2019.01) |

(52) U.S. Cl.
CPC .............. *A23P 30/20* (2016.08); *A22C 7/00* (2013.01); *A22C 11/0209* (2013.01); *B29C 48/30* (2019.02); *B29C 48/022* (2019.02)

(58) Field of Classification Search
CPC ....... A23P 30/20; A22C 7/00; A22C 11/0209; B29C 48/30; B29C 48/022

USPC ....................... 452/30–32, 35–37, 46–48, 51
See application file for complete search history.

(56) References Cited

U.S. PATENT DOCUMENTS

| | | | |
|---|---|---|---|
| 2,771,366 A | 11/1956 | Shadid | |
| 4,058,633 A | 11/1977 | Staff et al. | |
| 4,651,498 A * | 3/1987 | Piereder | A22C 11/02 |
| | | | 452/42 |
| 4,689,237 A | 8/1987 | Fabre | |
| 4,958,477 A | 9/1990 | Winkler | |
| 5,887,415 A | 3/1999 | Matthews et al. | |
| 5,928,705 A | 7/1999 | Matthews et al. | |
| 6,056,634 A | 5/2000 | Schwarz et al. | |
| 6,283,846 B1 | 9/2001 | Townsend | |
| 6,306,446 B1 | 10/2001 | Matthews et al. | |
| 6,846,234 B1 | 1/2005 | Hergott et al. | |
| 7,655,164 B2 | 2/2010 | Poulin et al. | |
| 8,353,743 B1 | 1/2013 | Benson et al. | |

(Continued)

*Primary Examiner* — Richard T Price, Jr.
(74) *Attorney, Agent, or Firm* — Greensfelder, Hemker & Gale, P.C.; Mark E. Stallion

(57) ABSTRACT

A method and apparatus for an extrusion horn including an inner compression chamber having an interior channel extending from an open infeed port to an open exit port, where a top inner surface of the interior channel progressively tapers down with an initial slope having an initial downward taper to a target thickness, then top inner surface abruptly steps to an increased thickness of the channel, and then progressively tapers down with a secondary slope where the secondary slope has a steeper downward taper than the slope of the initial downward taper. An apparatus and method for extruding extrudate through an extruding horn conducive for producing bacon bits and jerky.

14 Claims, 35 Drawing Sheets

(56) References Cited

U.S. PATENT DOCUMENTS

| | | |
|---|---|---|
| 8,645,643 B2 | 2/2014 | Sakada et al. |
| 10,368,572 B2 * | 8/2019 | Christie .................... A22C 7/00 |
| 10,624,383 B1 * | 4/2020 | Christie .................. A23P 30/20 |
| 10,694,773 B1 * | 6/2020 | Christie ............. A22C 11/0209 |
| 11,039,629 B2 * | 6/2021 | Wenger ................ B01F 15/068 |
| 2002/0115401 A1 | 8/2002 | Kobussen et al. |
| 2017/0231264 A1 * | 8/2017 | Christie .................. A23P 30/20 |
| | | 426/516 |

* cited by examiner

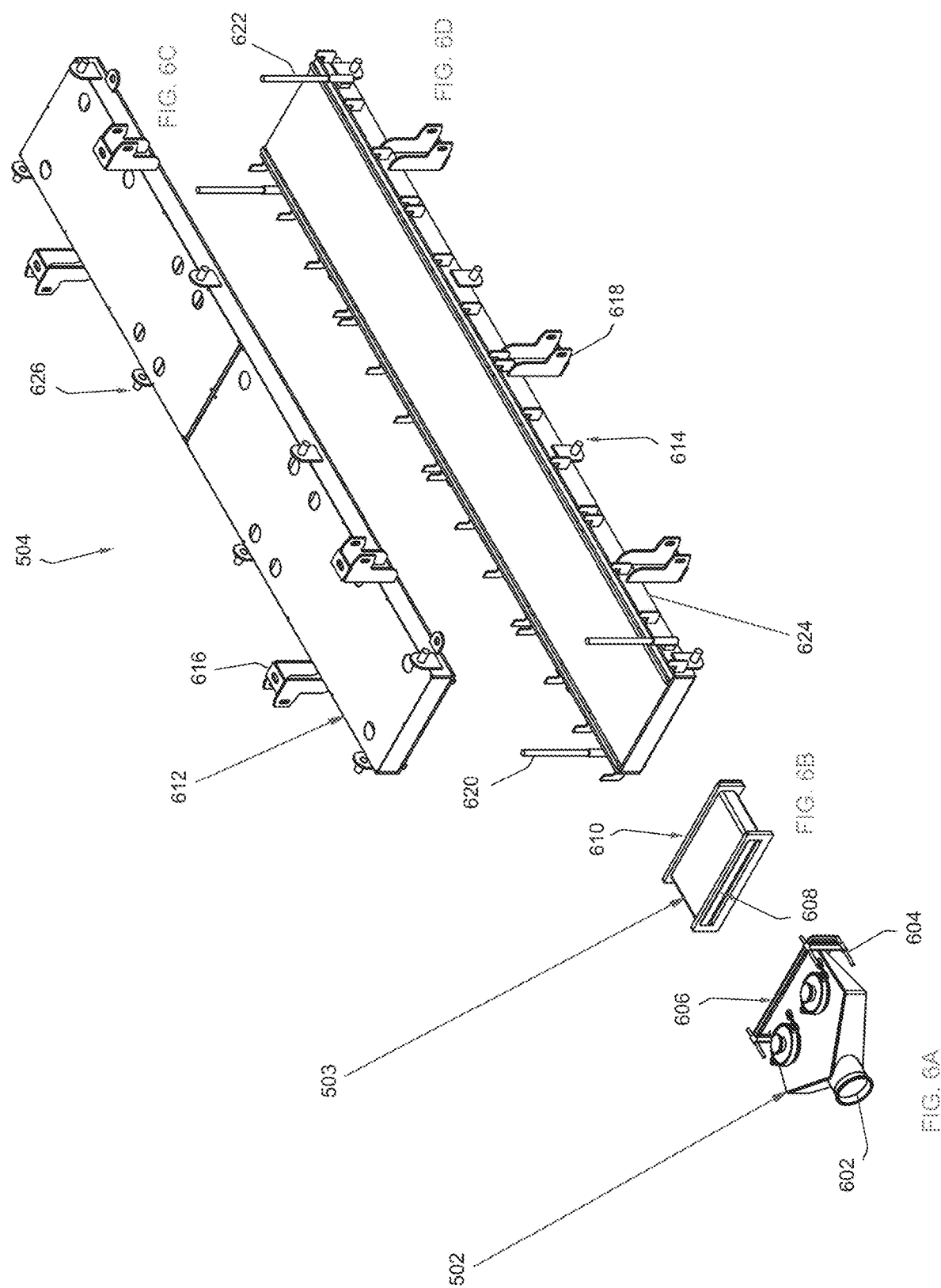

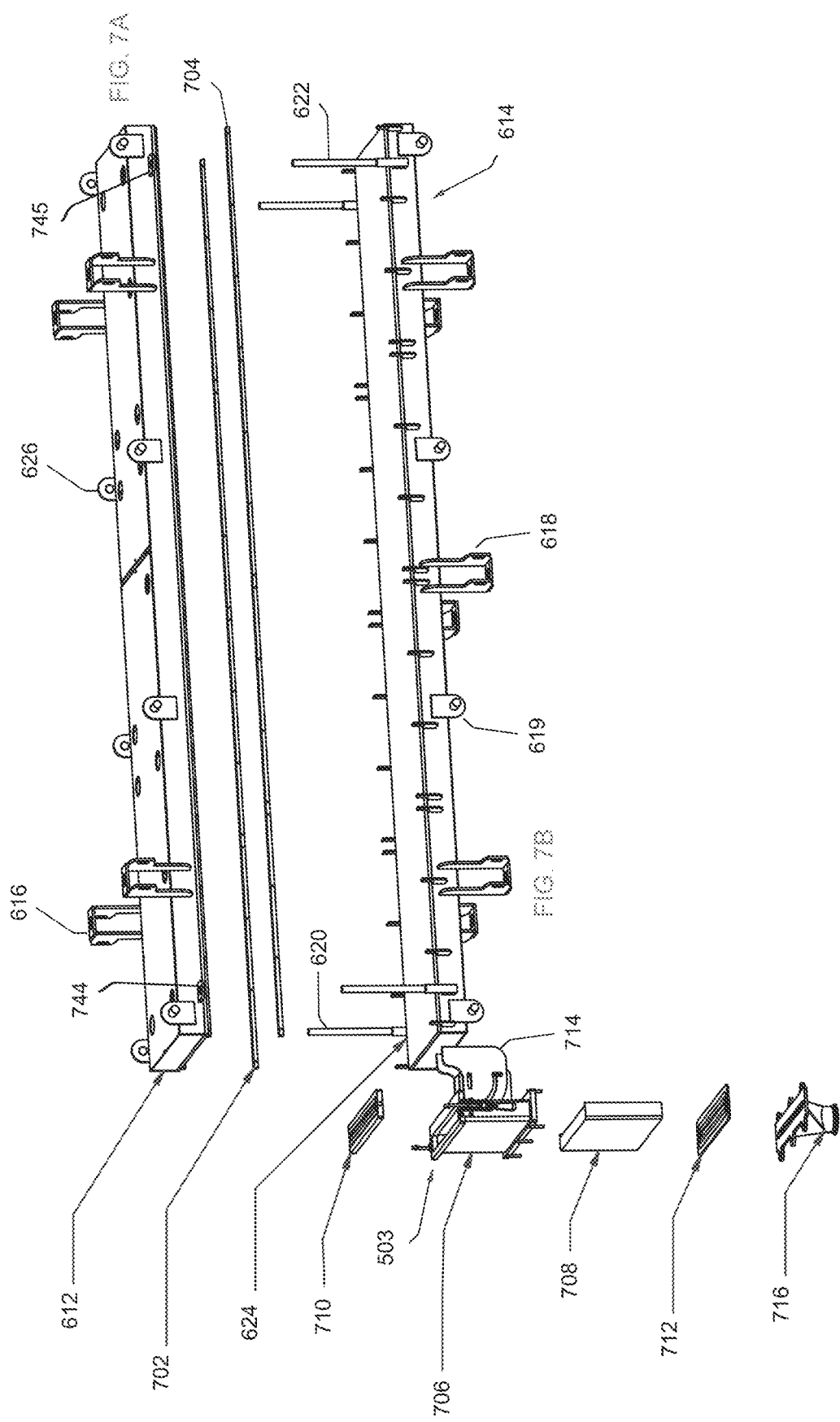

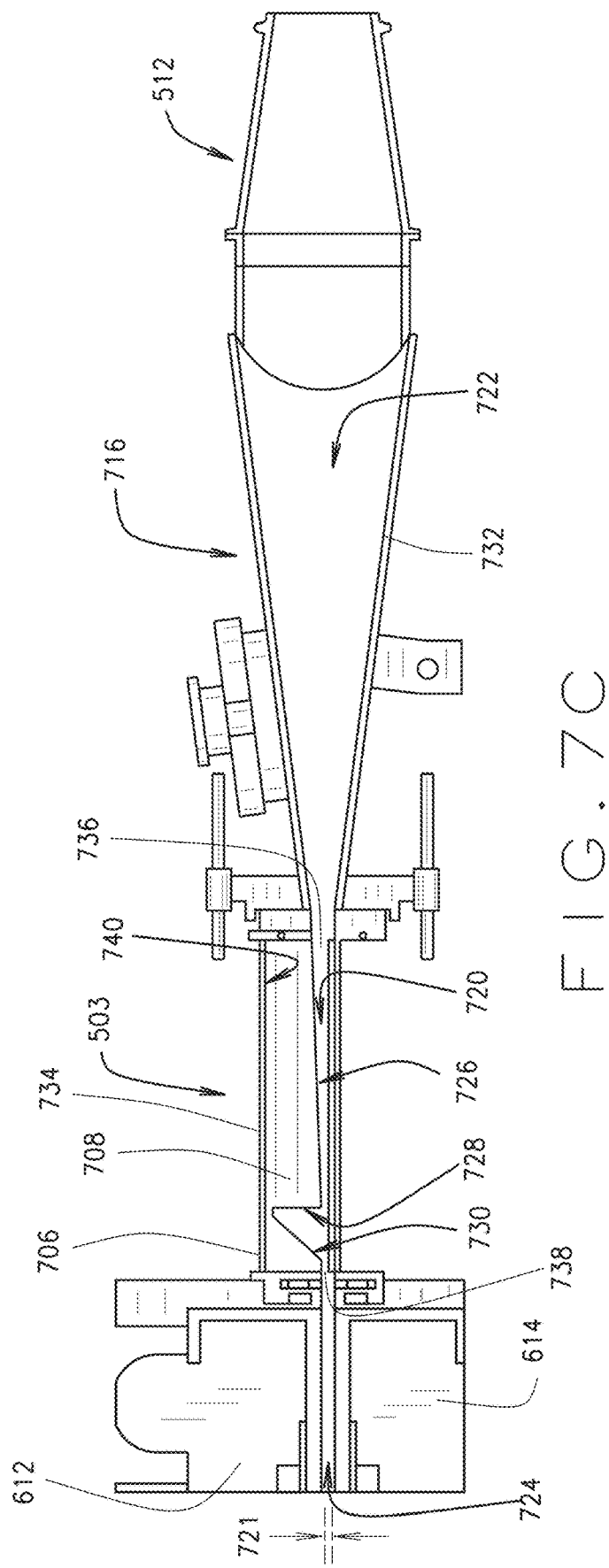

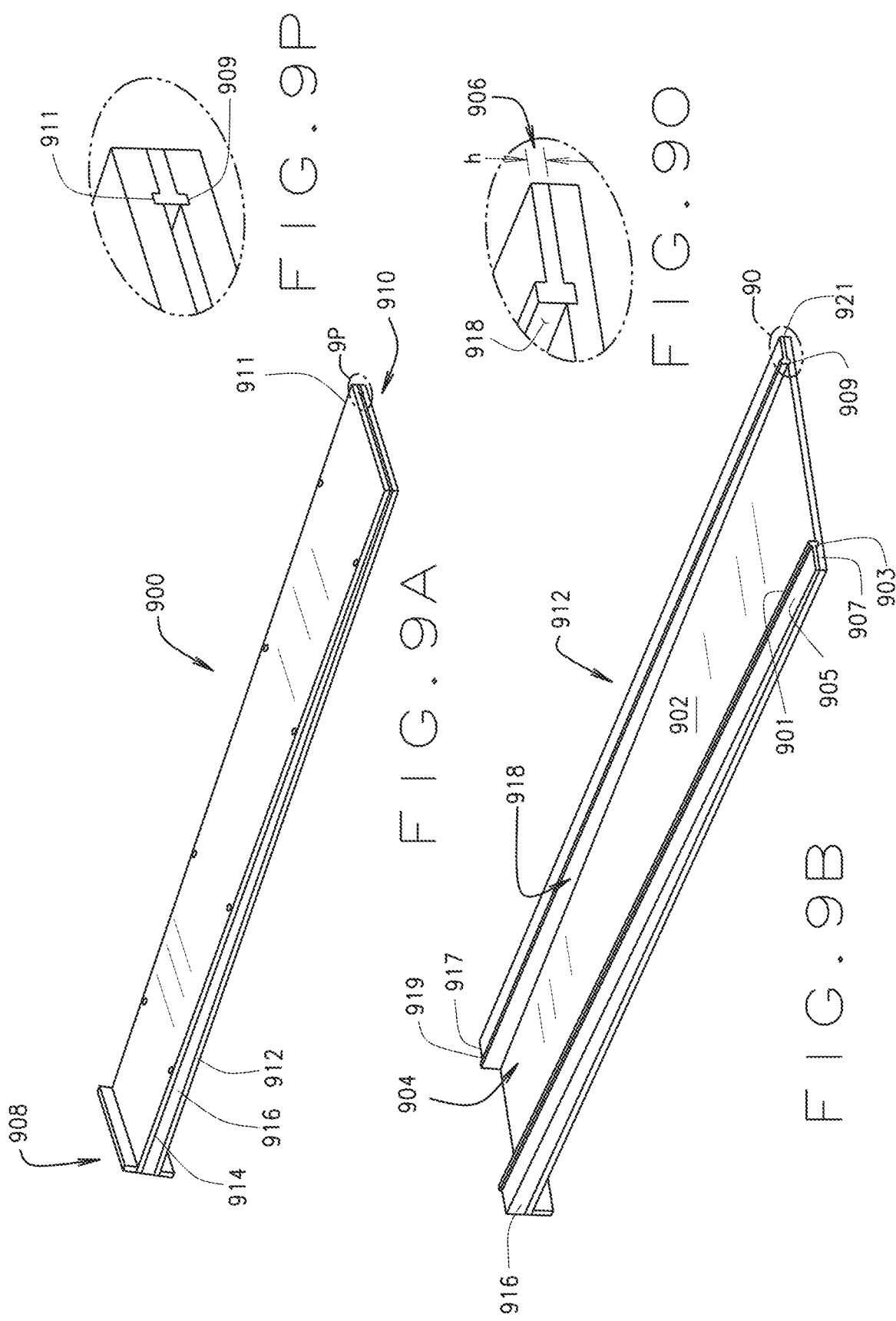

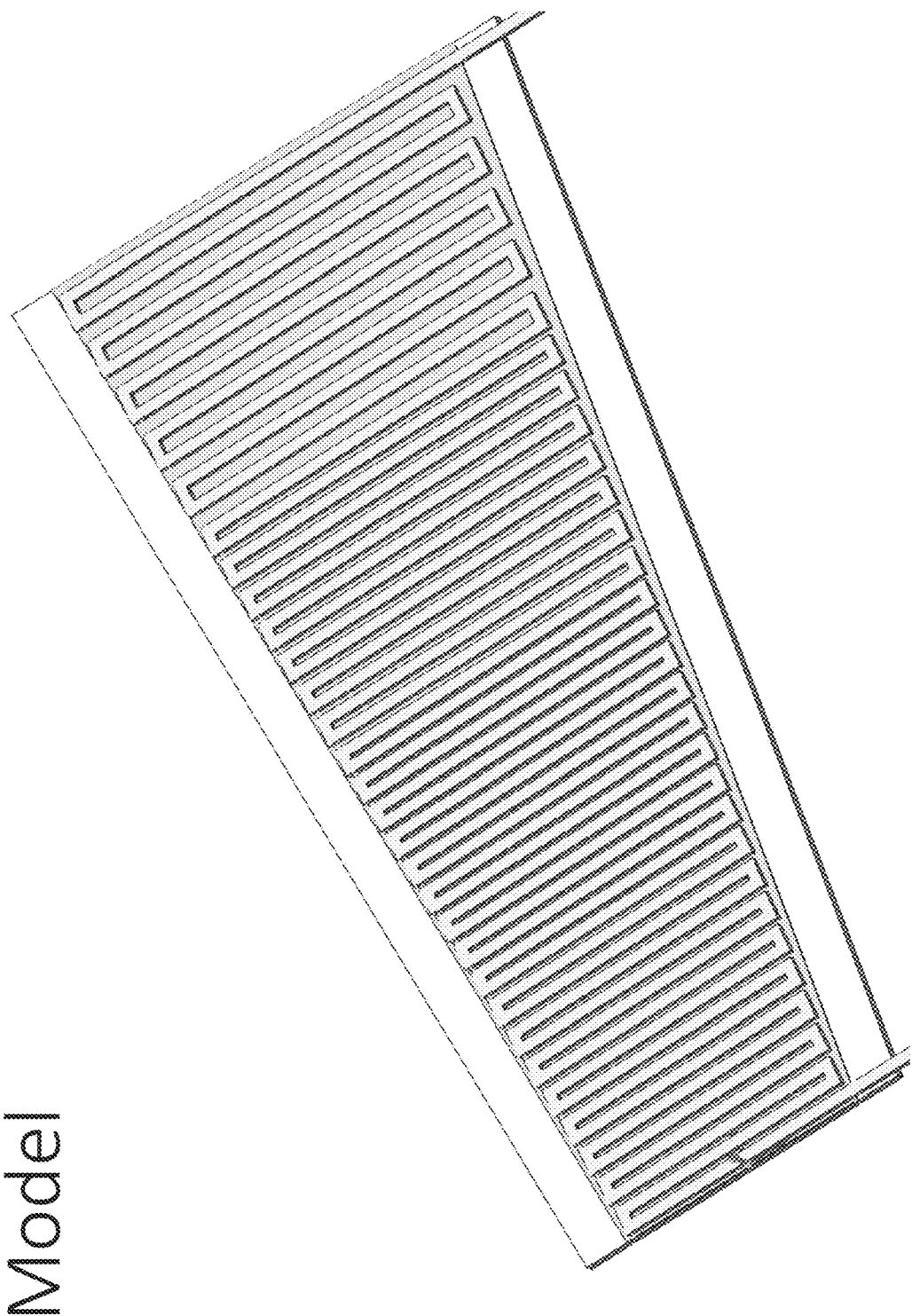
3D Coil Model  FIG. 9N

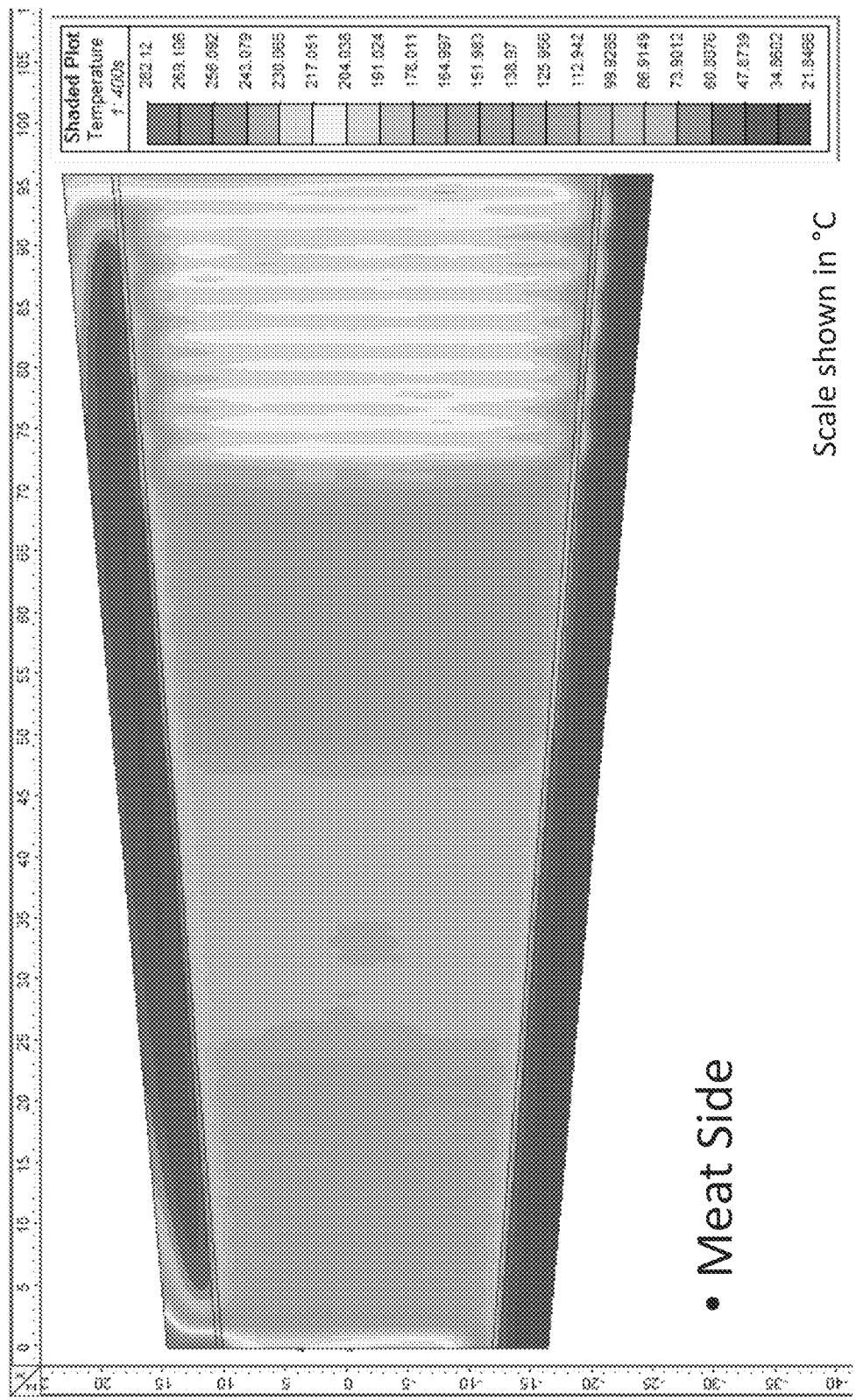

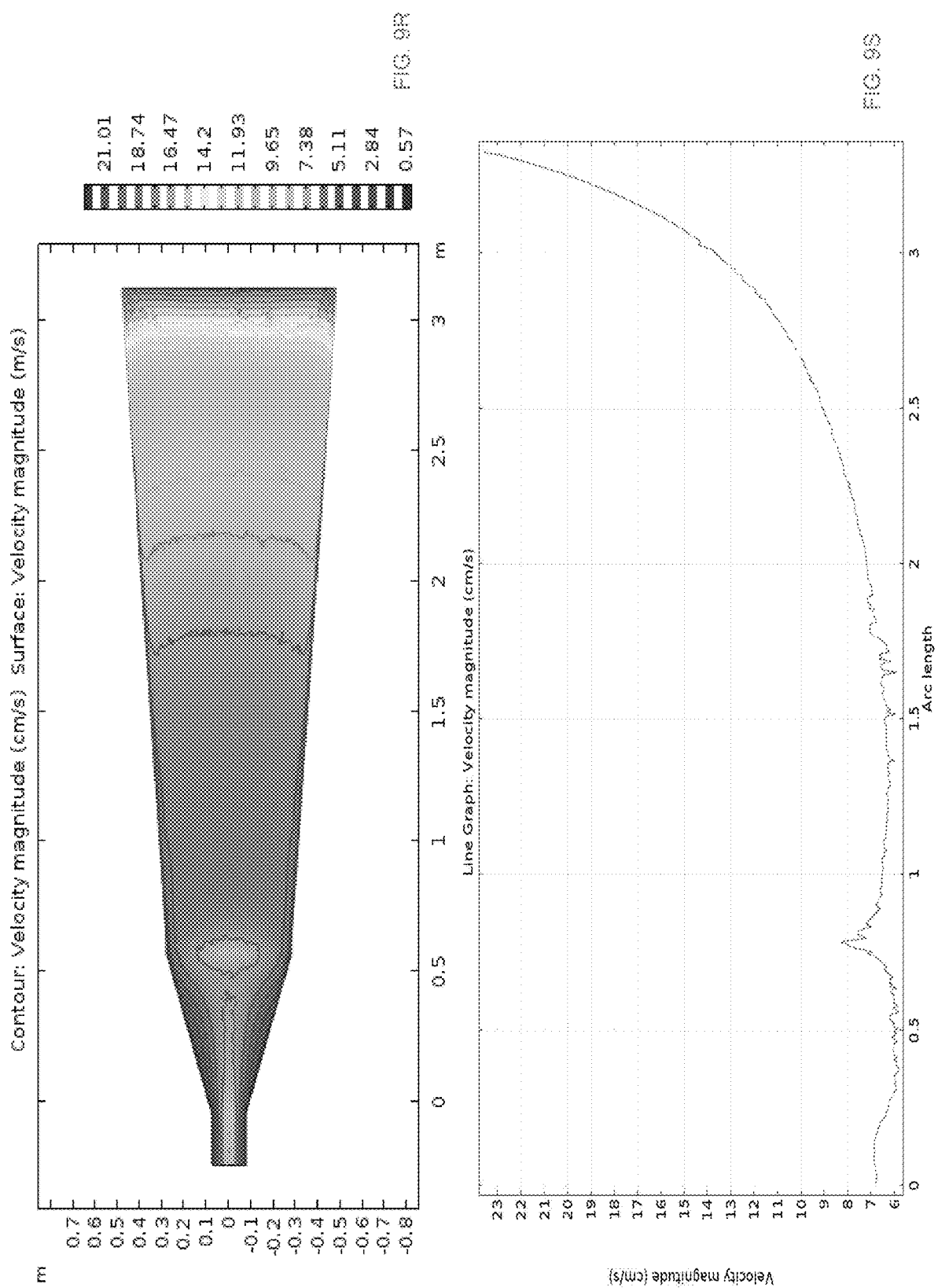

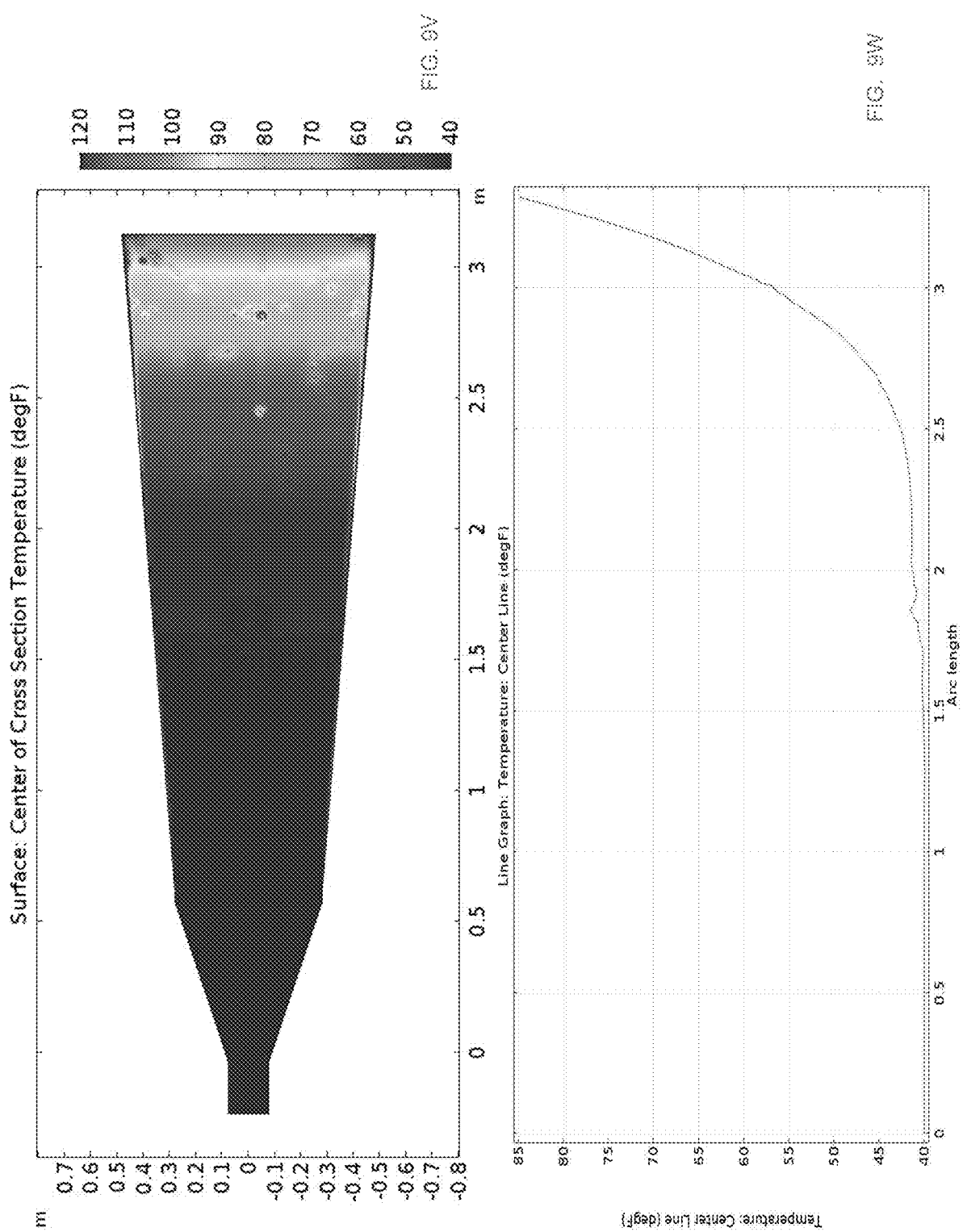

COOKING EXTRUSION HORN

CROSS REFERENCE

This Application Is A Divisional United States Patent Application, which is a divisional application of and claims priority to U.S. patent application Ser. No. 16/912,998 Entitled COOKING EXTRUSION HORN, filed Jun. 26, 2020, WHERE Said Application Is A Continuation-In-Part Of and Claims Priority To U.S. patent application Ser. No. 16/532,038 Entitled COOKING EXTRUSION HORN, filed Aug. 5, 2019, which is a Divisional Application of and Claims Priority to Ser. No. 15/042,689 Entitled COOKING EXTRUSION HORN, filed Feb. 12, 2016, and is now issued as U.S. Pat. No. 10,368,572, all of which are incorporated herein by reference in their entirety.

BACKGROUND

Field

This technology relates generally to stuffing horns, more particularly, to a stuffing horn configuration for cooking a product.

Background Art

A wide variety of products, such as food products, require processing before use by or sale to consumers. Generally, food products are processed in various stages, for example marinating, cutting, deboning, breading, adding spices, cooking, dicing, brazing, searing, freezing, and packaging, and combinations thereof. In particular, a known processing system provides for the transportation of meat food products, such as chicken breasts or tenders, or any animal or plant based protein item from a marinating tumbler to an oven. The product can also be a ground meat product or meat batter or other food extrudate that can be formed into a final product having a particular shape or form factor after being extruded through a horn device and subsequently placed in a bag that is vacuum sealed or other casing such as a collagen film or a coating material that may consist of a mixture or gel with a coagulatable protein. This type of food processing system can be a continuous food processing system whereby an edible food strand of meat or the like is extruded and is processed into a product or a desired meat cut. The exterior of the product is subject to contamination prior packaging, therefore, cooking the food product during food processing is common.

Meat based food products are often deposited onto an oven belt or other conveyor belt as it is being processed. The conveyor belt passes through an oven to cook the meat food products. In such a system, a plurality of conveyor belts can be used to transfer the meat food product from, for example, a marinating tumbler through a press belt and onto the oven belt. A plurality of operators can also be employed to ensure that the meat food products are evenly distributed on the conveyor in order to avoid pile up, reduce floor loss and on oven belts in order to cook the meat food products uniformly and thoroughly.

The above food processing methods are generally known. These known methods are being used for the extrusion of sausage or sausage-like materials or other protein based products. In principal this method involves the extrusion, through an extrusion horn, of a product such as that of a sausage mix. The food extrudate can be extruded when the extrudate is warm or cold. The stuffer horn can also act as a heating element as well as an extruder in a manner that is sufficient to at least partially cook the food extrudate. However, the problem with many stuffer horn devices is that the horn design is not configured to allow for uniform flow of food extrudate and the devices do not provide uniform size and cross section extrusion for the food extrudate throughout the entire cooking process.

Existing equipment and processes have other shortcomings. Among these shortcomings are extruders which are complex. Conveyors used for the strand are open and invite unwanted lateral movement of the strand during movement through the conveyer trough.

BRIEF SUMMARY

Compression Nozzle/Conduit Having an Inner Compression Chamber:

An implementation of the technology as disclosed and claimed herein and as illustrated in FIGS. 7 and 8, is an extrusion horn including an inner compression chamber having an interior channel extending from an open infeed port to an open exit port, where a top inner surface of the interior channel progressively tapers down to a target thickness with an initial slope having an initial downward taper, then the top inner surface of the interior channel abruptly steps to an increased thickness of the channel, and then progressively tapers down with a secondary slope where the secondary slope has a steeper downward taper than the slope of the initial downward taper. It is noted that the bottom inner surface can have the taper as described in lieu of the top inner surface without departing from the scope of the invention. Also, both the top and the bottom inner surfaces can have similar tapers as described. Any inner surface can accomplish the same effect without departing from the scope of the invention.

The objective is to gradually reduce the cross sectional area of the interior channel using an initial inward taper of the inner surface of the interior channel in order to restrict flow, then abruptly increase the cross sectional area of the interior channel, and then gradually reduce the cross sectional area again using a secondary inward taper where the graduation of the secondary tapered reduction has a steeper inward slope than that of the tapered graduation of the initial slope. This implementation provides for a desired back pressure as the product is being extruded. In one implementation the inner compression chamber is surrounded by an outer housing having straight parallel sides forming a sleeve channel extending from the open infeed port to the open exit port, and where the inner compression chamber is inserted in the sleeve channel and for one implementation said inner compression chamber has a contacting relationship with the straight parallel sides.

Compression Nozzle/Conduit Combined with Precompression Nozzle and Cooking Plates:

One implementation of the extrusion horn compression nozzle/conduit having an inner compression chamber is configured where the open infeed port is communicably connected to a pre-compression nozzle exit port and the open exit port is communicably connected to a cook plate entry port. For one implementation, the outer housing with the inner compression chamber inserted therein is mounted to a break action hinge mechanism where the break action hinge mechanism rotates about an axis perpendicularly to the interior channel such that it rotates from an engagement position where the open exit port is communicably connected to the cook plate entry port to a disengagement position where the open exit port is not communicably connected to the cook plate entry port. The break action hinge mechanism used for engagement and disengagement facilitates access to the interior channel of the compression chamber for cleaning.

For one implementation of the technology as disclosed and claimed herein, in addition to using the inner compression chamber and outer housing combination as a compression nozzle, for another implementation the combination is also combined with a pre-compression nozzle having a conduit communicably extending between a pre-compression nozzle entry portal and the pre-compression nozzle exit portal as illustrated in FIGS. 5 and 6. The conduit has a feeder conduit portion communicably extending from the pre-compression nozzle entry portal and communicably contacting in-line end-to-end a tapered portion communicably extending to the pre-compression nozzle exit portal. The tapered portion of the conduit has an outwardly tapered end and an inwardly tapered end where the outwardly tapered end is disposed at an upstream position with respect to the inwardly tapered end communicably extending to the pre-compression nozzle exit portal.

For one implementation of the extrusion horn including the pre-compression nozzle and the inner compression chamber combination, the outwardly tapered end of the tapered portion of the conduit of the pre-compression nozzle includes an upper outwardly tapered plate and a lower outwardly tapered plate each extending downstream and tapered outwardly one with respect to the other where a distance between the upper outwardly tapered plate and the lower outwardly tapered plate increases as the upper outwardly tapered plate and lower outwardly tapered plate extend downstream. A distance between outer edges of the upper outwardly tapered plate and the lower outwardly tapered plate increases as the upper outwardly tapered plate and the lower outwardly tapered plate extend downstream. Also, for one implementation of the technology, the outwardly tapered end of the tapered portion of the conduit includes a left-side outwardly tapered plate and a right-side outwardly tapered plate each extending downstream and tapered outwardly one with respect to the other where a distance between the left-side outwardly tapered plate and the right-side outwardly tapered plate increases as the left-side outwardly tapered plate and the right-side outwardly tapered plate extend downstream. A distance between outer edges of the left-side outwardly tapered plate and the right-side outwardly tapered plate increases as the left-side outwardly tapered plate and the right-side outwardly tapered plate extend downstream.

For yet another implementation of the extrusion horn including a combination of the pre-compression nozzle and the inner compression chamber, the inwardly tapered end of the tapered portion of the conduit of the pre-compression nozzle includes an upper inwardly tapered plate and a lower inwardly tapered plate each extending downstream and tapered inwardly one with respect to the other where a distance between the upper inwardly tapered plate and the lower inwardly tapered plate decreases as the upper inwardly tapered plate and lower inwardly tapered plate extend downstream. A distance between outer edges of the upper inwardly tapered plate and the lower inwardly tapered plate decreases as the upper inwardly tapered plate and the lower inwardly tapered plate extend downstream.

The inwardly tapered end of the tapered portion of the conduit includes a left-side inwardly tapered plate and a right-side inwardly tapered plate each extending downstream and tapered inwardly one with respect to the other where a distance between the left-side inwardly tapered plate and the right-side inwardly tapered plate decreases as the left-side inwardly tapered plate and the right-side inwardly tapered plate extend downstream. A distance between outer edges of the left-side inwardly tapered plate and the right-side inwardly tapered plate decreases as the left-side inwardly tapered plate and the right-side inwardly tapered plate extend downstream.

For one configuration the pre-compression nozzle entry portal is a slitted entry opening in an entry end of the feeder conduit portion. The pre-compression nozzle exit portal is a slitted exit opening.

Method of Extruding Through a Compression Chamber:

One implementation of the technology as disclosed and claimed herein is a method of extruding extrudate through an extrusion horn. The method includes extruding and an extrudate through an interior channel of an inner compression chamber, from an open infeed port of said interior channel to an open exit port. The method of extruding the extrudate includes variably restricting the extrudate flow with a top inner surface of the interior channel, where the top inner surface progressively tapers down with an initial slope, having an initial downward taper, to a target thickness. The method continues extruding extrudate through the interior channel to and through a point where the thickness of the channel abruptly steps to an increased thickness. The top inner surface of the interior channel then progressively tapers down with a secondary slope where the secondary slope has a steeper downward taper than the initial downward taper. One implementation of the method includes providing an outer housing having straight parallel sides forming a sleeve channel extending from the open infeed port to the open exit port, and where the inner compression chamber is co-axially inserted in the sleeve channel and said inner compression chamber is contacting the straight parallel sides such that the outer housing is resisting outward expansion of the compression chamber.

Method of Extruding Through a Compression Chamber Coupled with a Precompression Nozzle:

Another implementation of the method of extruding extrudate as disclosed and claimed herein includes extruding extrudate through a conduit of a pre-compression nozzle from a pre-compression nozzle entry portal to the pre-compression nozzle exit portal, including extruding extrudate through a feeder conduit portion of said conduit. The feeder conduit portion is communicably extending from the pre-compression nozzle entry portal and communicably contacting in-line end-to-end a tapered portion communicably extending to the pre-compression nozzle exit portal. The method further includes variably extruding the extrudate through the tapered portion of the conduit with an outwardly tapered end and an inwardly tapered end where the outwardly tapered end is disposed at an upstream position with respect to the inwardly tapered end communicably extending to the pre-compression nozzle exit portal.

Pre-Compression Nozzle:

The technology as disclosed and claimed and as illustrated in FIGS. 1-4 is an extrusion horn having a geometry that allows for a uniform flow from the discharge end into a cooking section that sets the outer surfaces of continuous flow of all meat species. The technology as disclosed and claimed allows for uniform product thickness throughout the cooking process, increased system throughput, and increased bind in the sheet leading to overall increased product yields. The technology eliminates the need for a meat press ahead of the system to set thickness further reducing yields. The technology extrudes a uniform flow of whole muscle/whole muscle and ground proteins uniformly into a heated confined space that is designed to provide ample back pressure on the product preventing higher than atmospheric pressures resulting from ejecting the product stream prematurely.

The device increases through put by uniformly setting the product thickness thereby allowing for higher cook yields due to a uniform product thickness in the final cook step. The technology can be implemented in a device having a small footprint. The device increases bind in the sheet thus reducing dicing/slicing losses. The cooking section of the extrusion horn can sear the food extrudate, such as ground meat, under pressure. The taper of the cooking section of the extrusion horn (tapered thick to thin) can apply back pressure to the food extrudate flow. The cooking section of the extrusion horn seers the product on all sides as it passes through thereby cooking the food extrudate on the fly.

One implementation of the technology as disclosed and claimed is an extrusion horn apparatus including a conduit communicably extending between an entry portal and an exit portal, where said conduit includes a feeder conduit portion communicably extending from the entry portal and communicably contacting a tapered portion. The feeder conduit portion can be in-line and positioned end-to-end to the tapered portion, which communicably extends to the exit portal. Food extrudate can flow in through the entry portal and through an internal channel of the feeder conduit, which is in fluid communication with the tapered portion such that the food extrudate can flow out of the feeder conduit and through the tapered portion. The tapered portion of the conduit can have an outwardly tapered end and an inwardly tapered end where the outwardly tapered end is disposed at an upstream position with respect to the inwardly tapered end communicably extending to the exit portal. The inwardly tapered end can have a sufficient inward angle to provide adequate back pressure on the food extrudate so that the horn extrudes a uniform flow. The walls of the tapered portion of the conduit can be configured to be heating elements sufficient to sear the food extrudate as it passes through the tapered portion of the conduit.

Pre-Compression Nozzle and Compression Nozzle Conduit Combination:

In another implementation of the technology as disclosed and claimed is an extrusion horn including an inner compression chamber having an interior channel extending from an open infeed port to an open exit port, where a top inner surface of the interior channel progressively tapers down with an initial slope having an initial downward taper to a target thickness, then top inner surface abruptly steps to an increased thickness of the channel, and then progressively tapers down with a secondary slope where the secondary slope has a steeper downward taper than the slope of the initial downward taper. The term "downward" is used based on the orientation of the apparatus as shown in FIG. 7C and more generally in FIGS. 5-8. The taper can alternatively be described as an inward taper where the taper slopes inward toward the central axis of the interior channel. The goal essentially is to progressively reduce the cross sectional area of the interior channel. Another implementation of the present technology as disclosed and claimed includes an extrusion horn apparatus, which teaches a novel apparatus and method for extruding a product through a tapered portion of a conduit, which provides sufficient back pressure to assure a uniform flow and which acts as a heating element to sear the product or extrudate as it passes through.

Cooking Plate Assembly Having Upper and Lower Cooking Plates with Spacer there Between:

In yet another implementation of the technology, a cooking plate assembly shown in FIG. 9A, having an upper and lower cooking plate and is configured to produce a product that is not a continuous mass or sheet, but rather to produce a product that maintains the separation of the original smaller pieces so that the surface of the original smaller pieces are denatured as they pass through the cooking horn and as it exits the cooking plate or where the plates vertically taper inwardly, one with respect to the other, as they extend toward the exit such that exit portal thickness (height) is sufficiently thin to produce a thin sheet of extrudate product that will readily separate into smaller pieces. The pieces of meat do not cling together forming a continuous sheet. The cooking plate assembly shown in FIG. 9A conveys an extrusion that is extruded at a reduced pressure so that a continuous mass or sheet is not formed as it passes through the cooking plate. The interior cooking surface of the interior channel of the cooking plate through which the product travels is constructed of a material that provides a non-stick low-resistance surface so that the product as it is extruded through the cooking plate is conveyed through at a faster rate such that the product doesn't back up, thereby assisting the product to not form a continuous mass or sheet. The thickness or height of the exit portal can be thin or narrow to further assist the product as it exits to separate into smaller pieces rather than binding together in a continuous mass or sheet. The interior channel of the cooking plate through which the product travels has a graduated narrowing in thickness from the entry portal to the exit portal. The implementation illustrated in FIG. 9G is also configured with an upper and lower cooking plate with tapered spacers there between where the interior channel of the cooking plate through which the product travels also has a graduated narrowing in thickness from the entry portal to the exit portal, however, the width of the channel widens as the upper and lower plates extend from an entry end toward the exit end, such that the product as it is being extruded through the channel maintains the separation of the original smaller pieces so that the surface of the original smaller pieces are denatured as they pass through the cooking horn and as it exits the cooking plate.

One implementation of the technology is a cooking plate for an extrusion horn, where the cooking plate includes an upper cooking plate having an upper interior cooking surface and a lower cooking plate having a lower interior cooking surface, where the upper interior cooking surface and the lower interior cooking surface face each other, and where said upper interior cooking surface is proximately space apart from the lower interior cooking surface with a graduated spacing, where the graduated spacing is defined by a wedge shaped spacer gasket (tapered spacer) positioned between the upper interior cooking surface and the lower interior cooking surface.

Heating the Upper and Lower Cooking Plates by Induction:

The upper and lower cooking plates are heated sufficiently to cook the product as it is extruded through the interior channel. The cooking plates can be heated using various methods including using a steam or liquid jacket. For one implementation of heating the plates, the cooking plate for the extrusion horn includes an upper induction coil positioned proximate the upper cooking plate and on an opposing side of the upper cooking plate opposite the upper interior cooking surface. The cooking plate also includes a lower induction coil positioned proximate the lower cooking plate and on an opposing side of the lower cooking plate opposite the lower interior cooking surface.

For one implementation of the cooking plate, the cooking plate includes an entry nozzle having a nozzle channel extending from a nozzle entry opening to a nozzle exit opening where said nozzle channel is in fluid communication with a horn cooking channel defined by the upper interior cooking surface, the lower interior cooking surface and where the wedge shaped spacer gasket (tapered spacer) extends between the upper and lower cooking plates. The cross section of the horn cooking channel has a cross section that gradually gets smaller from a proximate end of the horn cooking channel to a distal end of the horn cooking channel in one implementation and in another implementation the interior channel also widens. The horn exit opening is sufficient small to induce a product being extruded to maintain the separation of the original smaller pieces, which were diced/slice or ground into small pieces.

One implementation of the technology includes a method of extruding extrudate through the extrusion horn that includes the steps of pumping a product through an interior channel of a cooking plate assembly and between an upper and lower interior cooking surface of an upper and lower cooking plate, which form the upper and lower interior side wall of the interior channel. One implementation of the method further includes inducing eddy currents in the upper and lower cooking plates using induction coils position proximate the upper and lower cooking plates thereby causing a temperature of the upper and lower cooking surface to increase to a desired cooking temperature. The method includes extruding the product through an exit portal having a cross section whose height is less than that of the entry portal to the channel and for another implementation the width of the exit portal is wider than the width of the entry portal. The vertical slope (angle between the plates) of the upper and lower plates as the vertical spacing between the upper and lower plate lessens and the final vertical height of the exit portal will depend on the type of product being processed and its density and viscosity and the original piece size of the product being extruded. The horizontal or lateral slope (angle between the opposing tapered spacers) as the lateral spacing between the spacers widens and the final lateral width of the exit portal will also depend on the type of product being processed and its density and viscosity and the original piece size of the product being extruded.

The technology as disclosed and claimed herein can be utilized for various protein based extrudate products, such as chicken breasts or tenders, or any animal or plant based protein items. The product can also be a ground meat product or meat batter or other food extrudate that can be formed into a final product having a particular shape or form factor after being extruded through the tapered horn device and subsequently placed in a bag that is vacuum sealed or other casing. These and other advantageous features of the present invention will be in part apparent and in part pointed out herein below.

BRIEF DESCRIPTION OF THE DRAWINGS

For a better understanding of the present invention, reference may be made to the accompanying drawings in which:

FIG. 5 is a perspective view illustrating the cooking horn system;

FIG. 7A is an exploded view of the top plate assembly;

FIG. 7B is an exploded view of the bottom plate assembly; and

FIG. 7C is a sectional view of the nozzle;

FIG. 9A is an isometric view of another implementation of the cooking plate assembly;

FIG. 9B is an isometric view of another implementation of the cooking plate assembly with the upper plate removed exposing the interior channel and the wedge shaped graduated spacers;

FIG. 9G is an illustration of an isometric view of a nozzle and another implementation of the cooking plate assembly that progressively widens as it extends;

FIG. 9N is an illustration of and isometric view of the induction coil design illustrating the graduated spacing between the coil elements as you transition from Zone 1 through Zone 4;

FIG. 9O is an illustration detailing the wedge shaped spacer;

FIG. 9P is an illustration of the wedge shaped spacer defining the height of the exit portal;

FIG. 9Q is a thermal profile of the cooking plate;

FIGS. 9R and 9S is a surface velocity profile;

FIG. 9V is an illustration of a center of cross section temperature profile;

FIG. 9W is an illustration of a center line temperature profile;

Figure 1A:
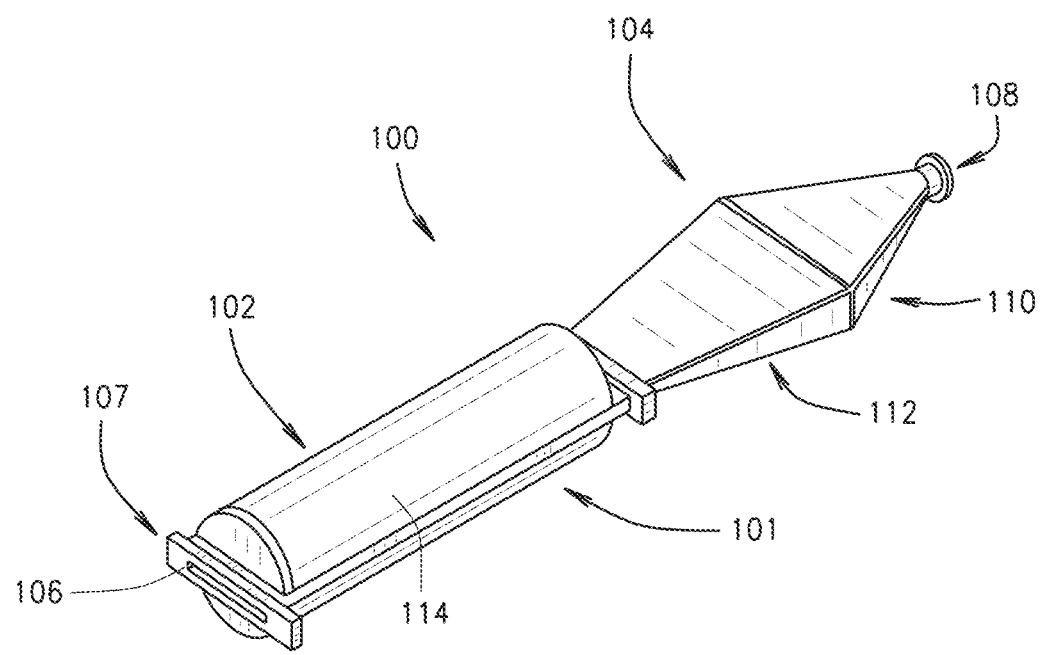
FIG. 1A is a perspective view of an extrusion horn illustrating the entry end.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF INVENTION

According to the embodiment(s) of the present invention, various views are illustrated in FIG. 1-12 and like reference numerals are being used consistently throughout to refer to like and corresponding parts of the invention for all of the various views and figures of the drawing. Also, please note that the first digit(s) of the reference number for a given item or part of the invention should correspond to the FIG. number in which the item or part is first identified.

One implementation of the technology as disclosed and claimed is an extrusion horn including an inner compression chamber having an interior channel extending from an open infeed port to an open exit port, where a top inner surface of the interior channel progressively tapers down with an initial slope having an initial downward taper to a target thickness, then top inner surface abruptly steps to an increased thickness of the channel, and then progressively tapers down with a secondary slope where the secondary slope has a steeper downward taper than the slope of the initial downward taper. The term "downward" is used based on the orientation of the apparatus as shown in FIG. 7C and more generally in FIGS. 5-8. The taper can alternatively be described as an inward taper where the taper slopes inward toward the central axis of the interior channel. The goal essentially is to progressively reduce the cross sectional area of the interior channel. Another implementation of the present technology as disclosed and claimed includes an extrusion horn apparatus, which teaches a novel apparatus and method for extruding a product through a tapered portion of a conduit, which provides sufficient back pressure to assure a uniform flow and which acts as a heating element to sear the product or extrudate as it passes through.

Figure 8:
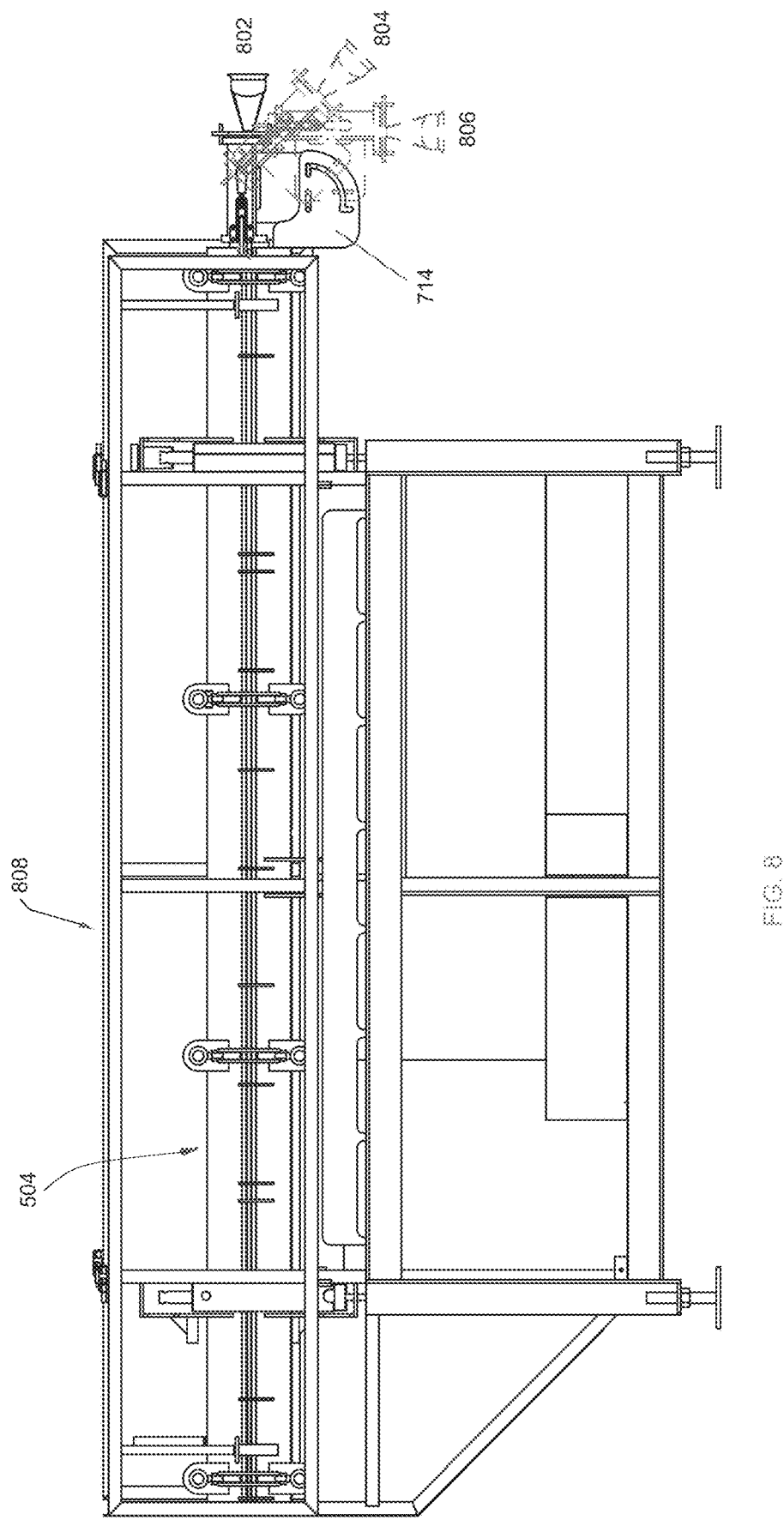
FIG. 8 is a side view of the cooking horn system.

The details of the invention and various embodiments can be better understood by referring to the figures of the drawing. Referring to FIG. 5 a perspective view illustrating a cooking horn system 500 is shown. The illustration as shown reflects an implementation were a pre-compression nozzle 502 is being used in combination with the pre-compression infeed nozzle 503 including a compression chamber and outer housing as further described herein. However, for one implementation the pre-compression infeed nozzle 503 is used without the pre-compression nozzle 502 as illustrated in FIGS. 7 and 8 of the drawing, where the infeed nozzle 503 is used with a basic tapered nozzle 516.

Figure 6:
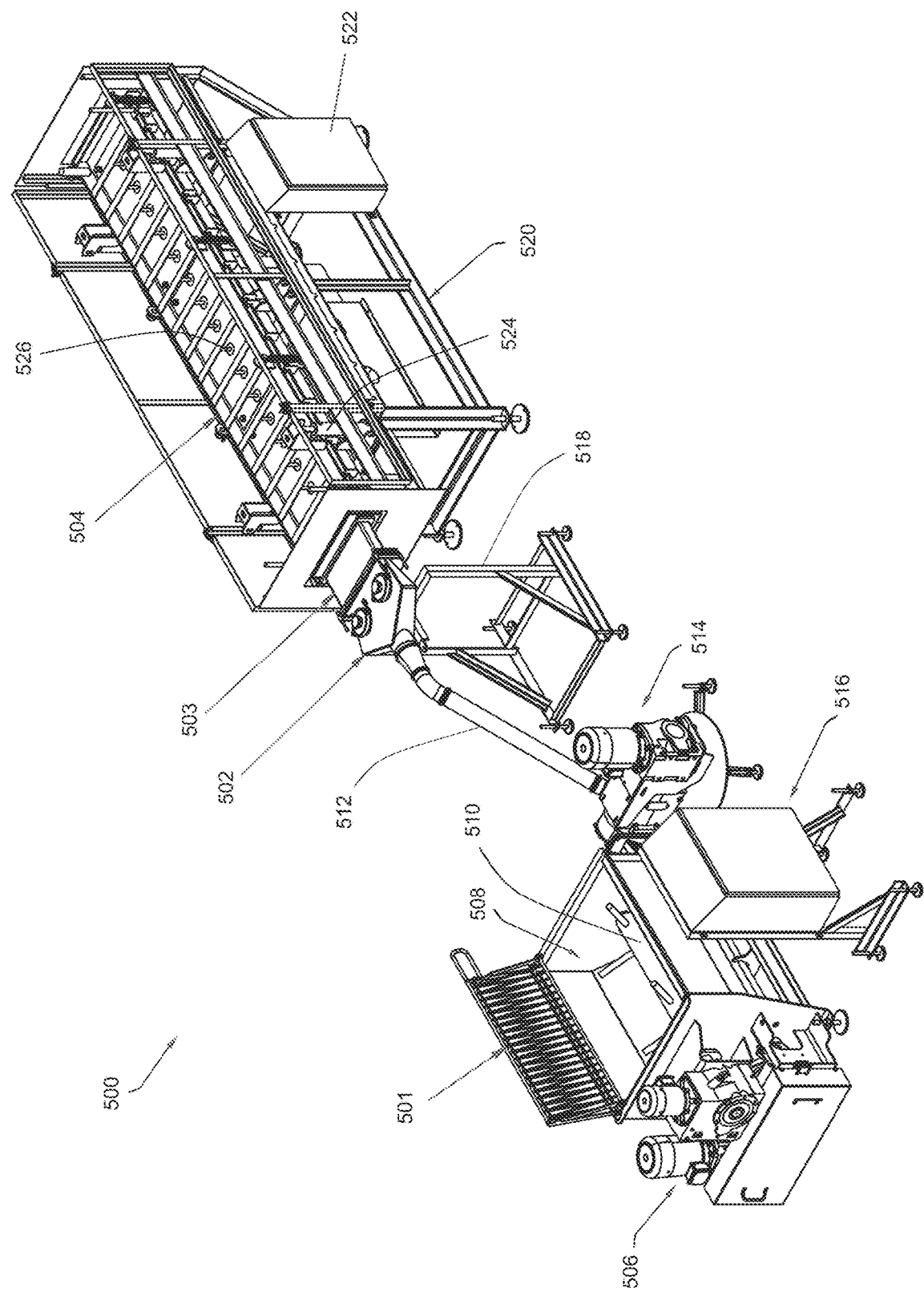
FIG. 6A is a perspective view of a pre compression nozzle.
FIG. 6B is a perspective view illustrating an infeed nozzle.
FIG. 6C is a perspective view illustrating the top portion of the cooking plate.
FIG. 6D is a perspective view illustrating the bottom portion of the cooking plate.

The cooking plate 504 is mounting in a support frame 520. The cooking plate has an upper plate and a lower plate as illustrated in FIGS. 6 and 7. The upper and lower plates are compressed together by compression members 526 and tension members 524. The infeed nozzle 503 is a conduit between and communicably linking the cooking plate and pre compression nozzle 502. In the case of the implementation where the pre compression nozzle 502 is not used, as shown in FIGS. 7 and 8, the infeed nozzle 503 is communicably linked directly to the extrudate channel 512. Product is placed in a hopper 508 and the product is mixed using a mixing drum 510 having mixing appendages extending radially outward from the drum to assist with mixing. In one implementation the drum is powered by a motor assembly 506, which in one implementation also powers a grinder for creating the extrudate product.

An extruder can be powered by an extruder motor assembly 514 that pushes the extrudate through an extrudate channel 512, or infeed pipe, that communicably links the extruder assembly and the pre-compression nozzle 502. The extrudate is then pushed through the pre-compression nozzle into the infeed nozzle. Power unit 522 provides power to the cooking plate 504. In the case of the implementation where the pre compression nozzle 502 is not used, as shown in FIGS. 7 and 8, the infeed nozzle 503 is communicably linked directly to the extrudate channel 512. Therefore, one implementation of the technology is configured without the pre-compression nozzle 502. The infeed nozzle as described herein provides sufficient pre-compression and this implementation is illustrated in FIGS. 7 and 8 where nozzle 716 is utilized in lieu of nozzle 502.

Referring to FIGS. 7A and 7B, a side perspective exploded view of the of the top 612 and bottom 614 portions of the cooking plate are shown along with the infeed nozzle 503 having an exterior tight fitting housing 706 and compression chamber 708. Also shown is one implementation of a transition nozzle 716 and inlet flange gasket 712 and outlet 710 flange gasket for the infeed nozzle 503. The infeed nozzle 503 is mounted on a rotatable break action hinge bracket 714 mechanism that is rotatable to engage and disengage the infeed nozzle 503 with the cooking plate 504, as illustrated in FIG. 8. Spacer 702 and 704 are also illustrated as gap spacers between the top 612 and the bottom 614 portions of the cooking plate, which can define the height in this configuration (or the cross sectional area) of the channel between the plates 612 and 614. The spacer diameters can be increase to increase the volume and flow capacity of the channel between the upper and lower plates to increase the flow and thickness (height) of the extrudate that flows there through. The cooking plate portions illustrated in FIGS. 7A and 7B are of similar configuration and implementation as illustrated in FIG. 6. Also illustrated in FIGS. 7A and 7B is the bottom plate 624, which includes compression member mounts 619 and tension cylinder mounts 618. The bottom plate also includes alignment pins 620 and 622 that insert through alignment eyelets 744 and 745 of the top plate 612. The top plate 612 includes compression member mounts 626 and tension cylinder mounts 616.

Referring to FIG. 7C, a sectional view of the compression chamber inserted in to the outer housing and communicably connected to the cooking plates 612 and 614, and the transition nozzle 716. The transition nozzle 716 has an outer wall 732 and an interior channel 722 that is in fluid communication with the interior channel 720 of the compression chamber 708. A top surface of the interior channel progressively tapers down with an initial slope 726 having an initial downward taper to a target thickness 721, then abruptly steps 728 to an increased thickness (height, which decrease cross sectional area of the interior channel), and then progressively tapers down with a secondary slope 730 back downward to the target thickness 721 where the secondary slope has a steeper downward taper than the initial downward taper. An outer housing 706 having straight parallel sides 734 forming a sleeve channel extending from the open infeed port 736 to the open exit port 738, and where the inner compression chamber 708 is inserted in the sleeve channel and said inner compression chamber has a contacting relationship 740 with the straight parallel sides which surround the inner compression chamber. The interior channel 720 is in fluid communication with the plate channel 724 between plates 612 and 614.

Referring to FIG. 8, a side view of the cooking plate 504 mounted in a frame assembly 808 is illustrated. Also illustrated is the operation of the rotatable break action hinge bracket 714 mechanism on which the infeed nozzle 503 is mounted. FIG. 8 illustrates the operation of the bracket as the infeed nozzle is rotated to various positions —802, 804 and 806. Position 802, illustrated in solid lines, is the fully engaged position where the infeed nozzle 503 is communicably connected with the cooking plates. Position 804, illustrated with broken lines, reflects a partially retracted and disengaged position and position 806, also illustrated in broken lines, reflects a fully retracted position.

Referring to FIG. 6A, a perspective view illustrating a pre compression nozzle 502 is shown. The pre compression nozzle 502 includes an entry portal 602 and an exit portal 606 communicably linked to the infeed nozzle for the extrudate. This pre-compression nozzle configuration as illustrated has a similar configuration to that of the tapered portion 104 of FIG. 1. The nozzle has an outwardly tapered end and an inwardly tapered end as it extends along the flow path from an upstream position to a downstream position, where the outwardly tapered end is disposed at an upstream position with respect to the inwardly tapered end.

The inwardly tapered end can include an upper inwardly tapered plate and a lower inwardly tapered plate each extending downstream and tapered inwardly one with respect to the other where a distance between the upper inwardly tapered plate and the lower inwardly tapered plate decreases as the upper inwardly tapered plate and lower inwardly tapered plate extend downstream. A distance between outer edges of the upper inwardly tapered plate and the lower inwardly tapered plate can decrease as the upper inwardly tapered plate and the lower inwardly tapered plate extend downstream.

The inwardly tapered end can include a left-side inwardly tapered plate and a right-side inwardly tapered plate each extending downstream and tapered inwardly one with respect to the other where a distance between the left-side inwardly tapered plate and the right-side inwardly tapered plate decreases as the left-side inwardly tapered plate and the right-side inwardly tapered plate extend downstream, and where a distance between outer edges of the left-side inwardly tapered plate and the right-side inwardly tapered plate decreases as the left-side inwardly tapered plate and the right-side inwardly tapered plate extend downstream.

The outwardly tapered end includes an upper outwardly tapered plate and a lower outwardly tapered plate each extending downstream and tapered outwardly one with respect to the other where a distance between the upper outwardly tapered plate and the lower outwardly tapered plate increases as the upper outwardly tapered plate and lower outwardly tapered plate extend downstream, and where a distance between outer edges of the upper outwardly tapered plate and the lower outwardly tapered plate increases as the upper outwardly tapered plate and the lower outwardly tapered plate extend downstream. The outwardly tapered end includes a left-side outwardly tapered plate and a right-side outwardly tapered plate each extending downstream and tapered outwardly one with respect to the other where a distance between the left-side outwardly tapered plate and the right-side outwardly tapered plate increases as the left-side outwardly tapered plate and the right-side outwardly tapered plate extend downstream, and where a distance between outer edges of the left-side outwardly tapered plate and the right-side outwardly tapered plate increases as the left-side outwardly tapered plate and the right-side outwardly tapered plate extend downstream.

Referring to FIG. 6B, a perspective view illustrating an infeed nozzle is shown. The infeed nozzle 503 includes a compression chamber enclosed in a tight fitting housing that is connected between the pre-compression nozzle 502 and the cooking plates 504. In one implementation the compression chamber is milled out of a plastic block and having an interior flow channel with the desired thickness and taper. In one implementation, the interior flow channel of the compression chamber can taper down (narrow) to a target thickness in the direction of flow and abruptly widen by approximately one inch and then taper down (narrow) again to the desired target thickness. The taper is designated to progressively reduce the cross sectional area of the interior flow channel to restrict the flow of extrudate. See FIG. 7C for a cross sectional view of the compression chamber illustrating the taper of the compression chamber's interior channel. The compression chamber is removable for cleaning.

Referring to FIG. 6C, a perspective view illustrating the top portion 612 of the cooking plate 504 is shown. The top plate 612 includes compression member mounts 626 and tension cylinder mounts 616.

Referring to FIG. 6D, a perspective view illustrating the bottom portion 624 of the cooking plate 504 is shown. The bottom plate 624 includes compression member mounts 614 and tension cylinder mounts 618. The bottom plate also includes alignment pins 622 that insert through alignment eyelets of the top plate 612.

Figure 9C:
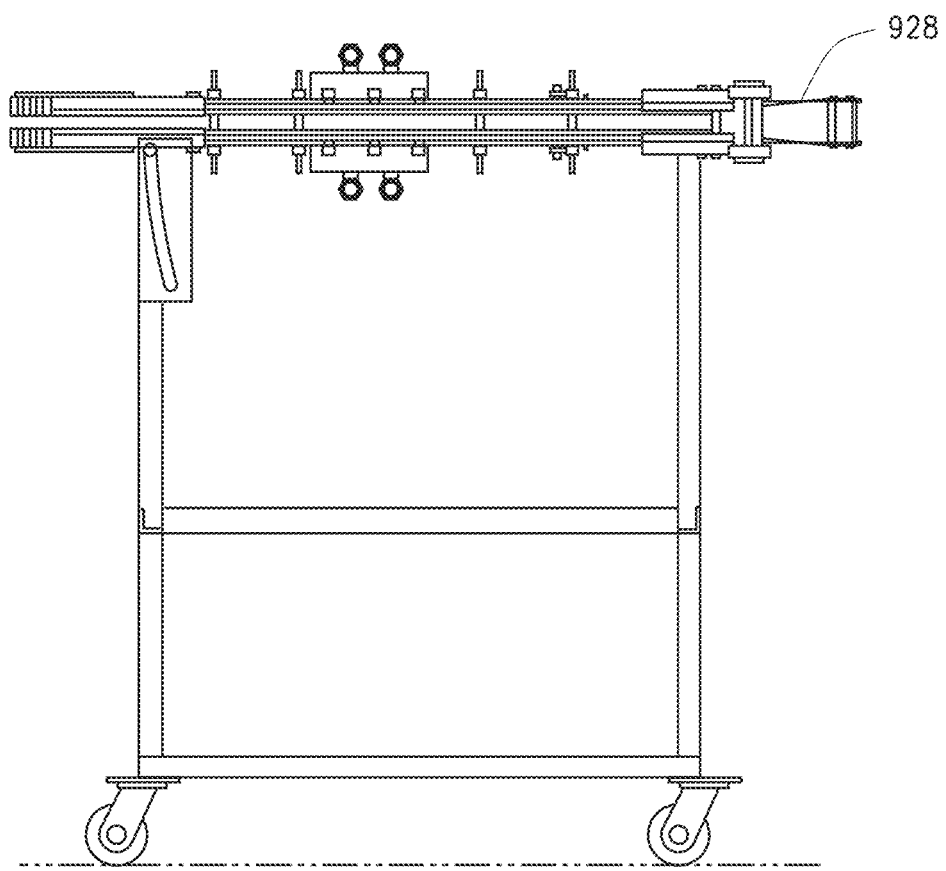
FIG. 9C is a side view of another implementation of the cooking plate assembly mounted on a support frame.

Referring to FIG. 9A a side view of another implementation of the cooking plate assembly 900 is shown. The cooking plate 504 as shown in FIG. 6D can be replaced with another cooking plate implementation for other products or can be used independently of items 502 and 503. The cooking plate assembly 900 shown in FIG. 9A is configured to produce a product that is not a continuous mass or sheet, but rather to produce and extrude an output product that separates into smaller pieces as it exits the cooking plate assembly 900. Examples of products that can be produced with this implementation include ground meat, beef jerky and bacon bit products.

The cooking plate assembly 900 shown in FIG. 9A conveys an extrusion that is extruded at a reduced pressure so that a continuous mass or sheet is not formed as it passes through the cooking plate assembly. The interior cooking surface 902, as seen in FIG. 9B, of the interior channel 904 of the cooking plate assembly 900 through which the product travels is constructed of a material that provides a non-stick low-friction coefficient surface so that the product as it is extruded through the cooking plate assembly 900 is conveyed through at a faster rate such that the product doesn't back up, thereby assisting the product to not form a continuous mass or sheet, but to maintain separation of the original individual pieces.

The thickness or height (h) 906 of the exit portal can be thin or narrow to further assist the product as it exits to maintain separation of the original smaller pieces rather than binding together in a continuous mass or sheet. The thickness of the exit portal also provides a certain product slice thickness. The interior channel 904 of the cooking plate assembly 900 through which the product travels can have a graduated narrowing in thickness from the entry portal 908 to the exit portal 910. The upper surface of the interior channel and the lower surface 902 of the interior channel are proximately spaced apart and slope inwardly one with respect to the other, thereby having a graduated narrowing in thickness or height from the entry portal 908 to the exit portal 910. The narrowing thickness or spacing could result in an increased pressure; however, this is counteracted by the reduced pressure under which the product is being pumped through the interior channel 904, and the non-stick, low-resistance surface 902 of the interior channel. In one implementation, the widening of the interior channel can reduce pressure.

The interior cooking surfaces of the interior channel are heated by induction heating. The cooking plate utilizes electrically conducting coils that generate eddy currents that cause the conductive plates to heat up. Induction heating is a non-contact method of heating a conductive body (i.e. plates) by utilizing a strong magnetic field from the specially designed coils. The coils do not contact the conductive plates. The conductive plates heat up responsive to its proximity to the strong magnetic field. The heated plates contact and heat up the meat. The advantage of an inductive heating system and method is that the heating temperature of the plates can reach a very high temperature (approximately 500 degrees F.) ins a short period of time and the surface temperature of the plates can be controlled by adjusting the power output to the coils. An induction heater consists of an electromagnet, and an electronic oscillator that passes a high-frequency alternating current (AC) through the electromagnet. The rapidly alternating magnetic field penetrates the object, generating electric currents inside a conductor called eddy currents. The eddy currents flowing through the resistance of the material heat it by Joule heating. In ferromagnetic (and ferromagnetic materials like iron, heat may also be generated by magnetic hysteresis losses. The frequency of current used depends on the object size, material type, coupling (between the work coil and the object to be heated) and the penetration depth. An important feature of the induction heating process is that the heat is generated inside the object itself, instead of by an external heat source via heat conduction. Therefore, objects can be heated very rapidly. In addition there need not be any external contact.

Therefore the interior cooking surface 902 of the cooking plate as disclosed and claimed herein can be heated by induction heating. Induction cooking is quite efficient, which means it puts less waste heat into the surrounding assembly. Induction heating can be quickly turned on and off, and is easily controlled for heating level. Induction cooking provides faster heating, improved thermal efficiency, and more consistent heating than cooking by thermal conduction, with more precise control over the heat provided. Therefore, the heat applied by the interior cooking surface to the product can be more precisely controlled. FIG. 9B provides an illustration of a lower cooking plate 912 and the upper cooking plate 914 is seen in FIG. 9A. A spacer or lateral seal 916 defines the spacing between the upper cooking plate 914 and the lower cooking plate 912 and provides a side seal between the upper and lower and defines the side wall 918 of the cooking channel 904.

Referring to FIG. 9B, a side isometric view of the lower cooking plate 912 is illustrated. FIG. 9O illustrates the spacer or lateral seal, which defines the height (h) 906 of the cooking channel 904. FIG. 9P provides a detail of the spacer between the upper and lower plates and how the spacer fits in the lengthwise grooves 911 and 909 of the upper and lower plates thereby forming a seal between the plates.

Figure 9D:
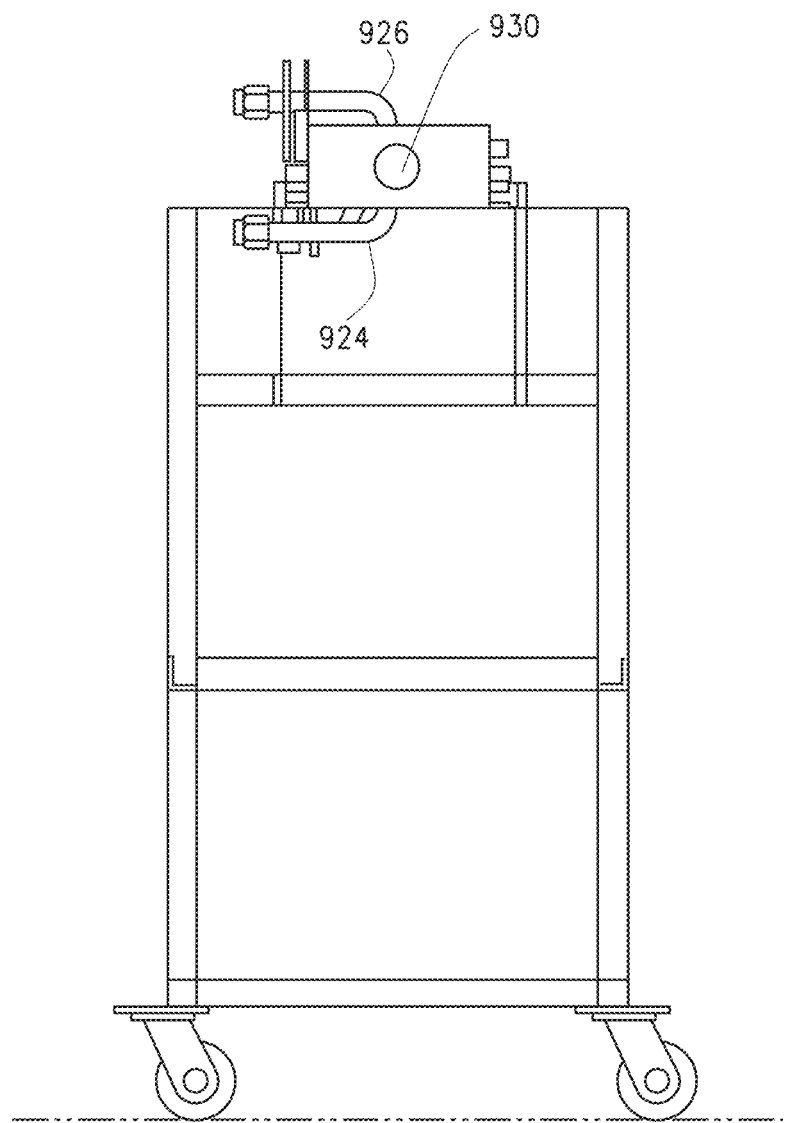
FIG. 9D is an end view of another implementation of the cooking plate assembly illustrating the nozzle input end.
Figure 9F:
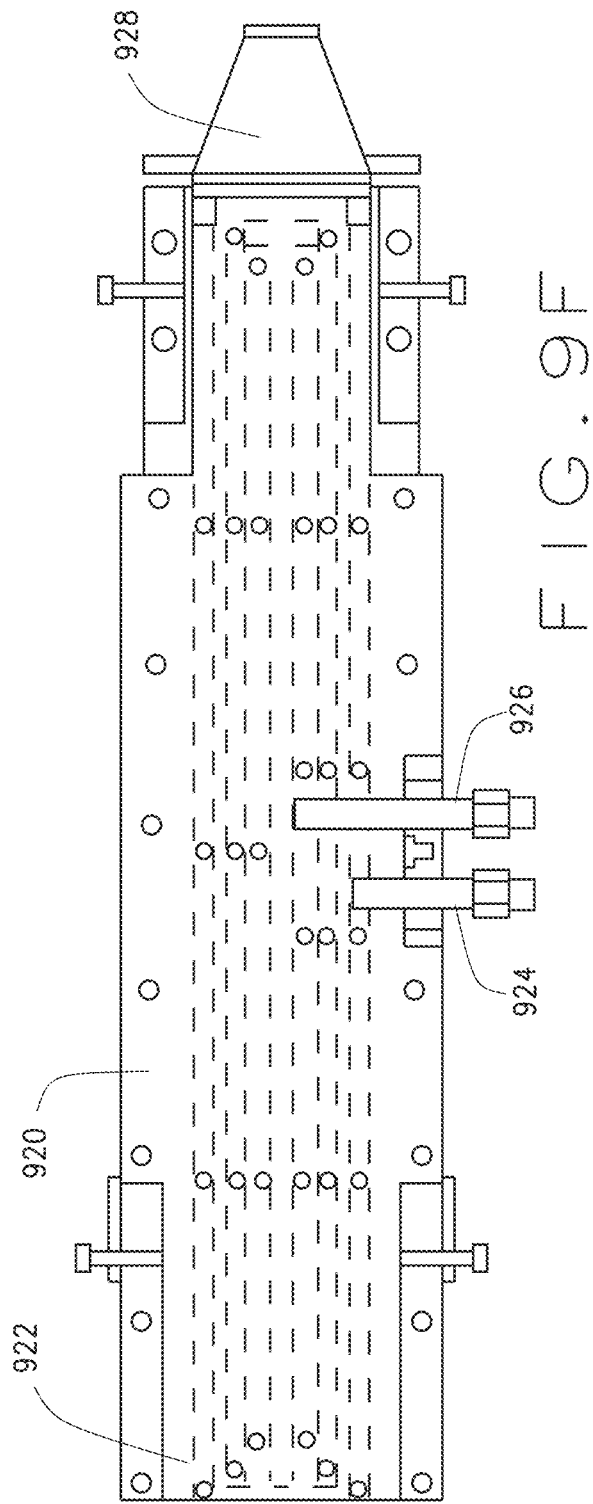
FIG. 9F is a top view of the cooking plate assembly illustrating the outer plate of the induction coils.
Figure 9E:
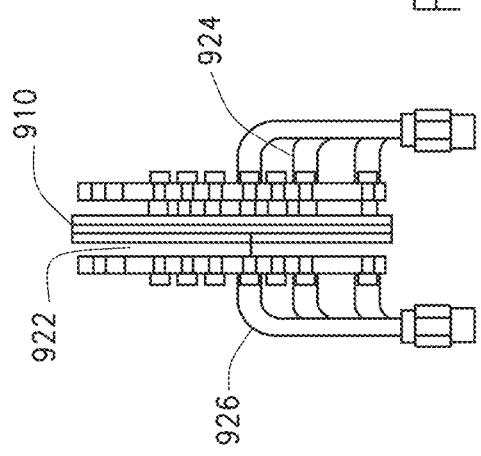
FIG. 9E is an opposing end view of another implementation of the cooking plate assembly illustrating the exit end.
Figure 9C:
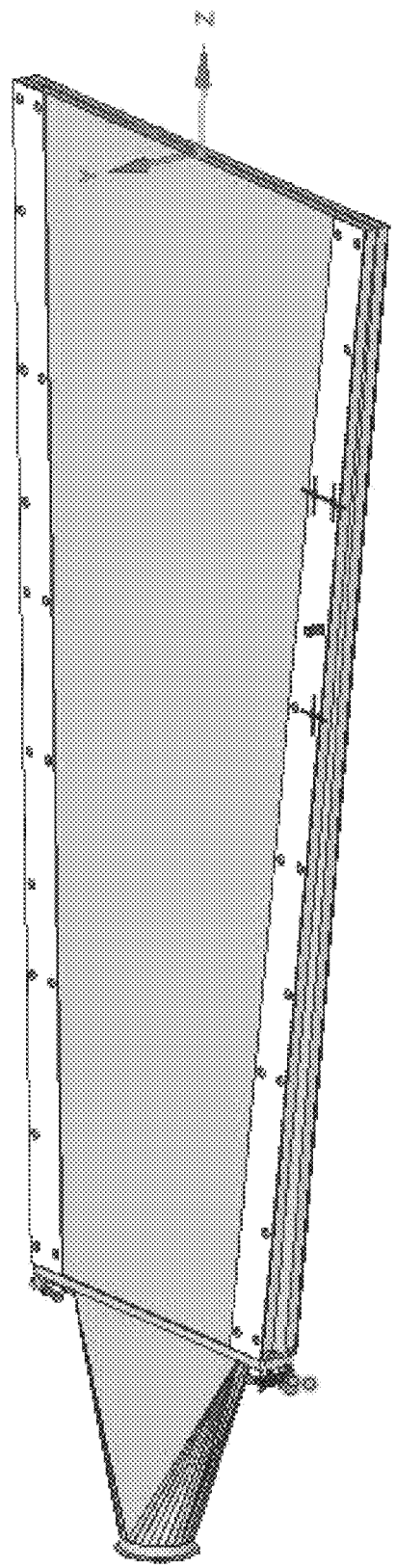
Figure 9H:
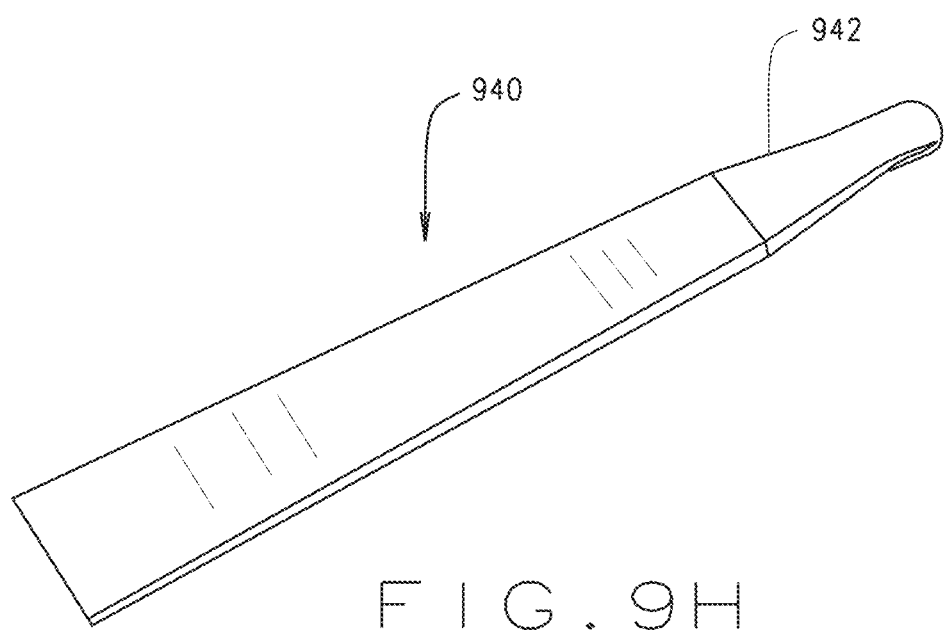
FIG. 9H is an isometric illustration of cooking plate assembly and the nozzle.
Figure 9I:
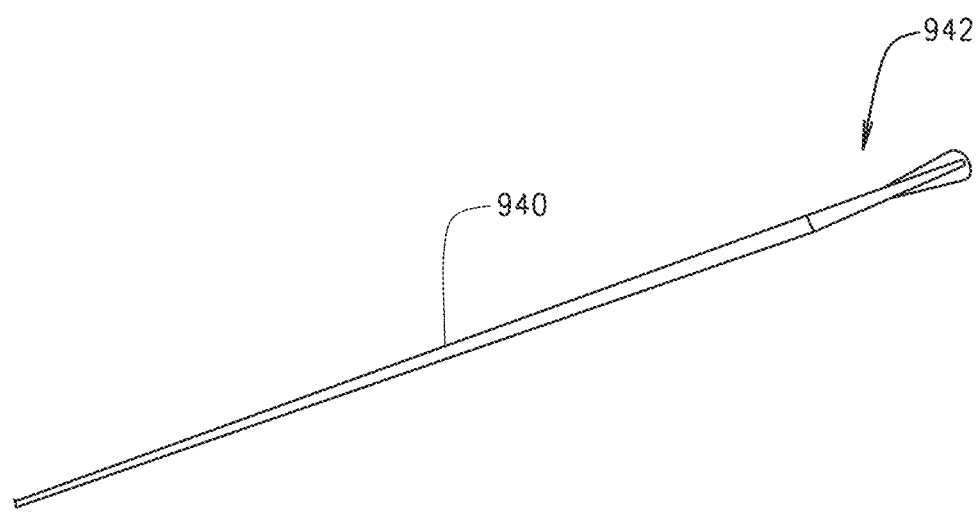
FIG. 9I is another isometric illustration of cooking plate assembly and the nozzle.

Referring to FIG. 9F a top view of another implementation of the cooking plate assembly is shown mounted on a support frame and having an induction heating assembly. The top review reveals a top cover plate 920 containing the inductive heating assembly for the top cooking surface. The dashed broken lines illustrate the windings 922 of the induction element. The top view also reveals the electrical conduits 924 and 926 that supply power to the induction elements. The cooking plate assembly entry portal is communicably attached to a nozzle 928 through which the product is pumped and channeled into the interior channel of the cooking plate assembly. Referring to FIG. 9D an end view of another implementation of the cooking plated assembly is shown illustrating the nozzle input 930. The entry portal of the cooking plate assembly is communicably connected to the output of the nozzle. FIG. 9E illustrates the exit portal 910 of the cooking plate assembly.

Referring to back to FIG. 9A, an isometric view of the cooking plate assembly 900 is shown. An isometric view of a cooking plate housing is illustrated. The cooking plate housing includes and upper elongated plate 914 and a lower elongated plate 912 where the upper and lower elongated plates are proximately spaced apart. The distance or spacing between the upper and lower plates gradually reduces from the entry end 908 to the exit end 910. The upper and lower plates and the lateral spacer gaskets 916 define an interior channel 904 that extends from an entry portal or entry opening 908 to an exit portal or exit opening 910. The lateral spacer gaskets 916 can have a wedge shaped geometry in order to provide the graduated spacing. The thickness or height (h) 906 of the exit portal, defined by the spacing between the upper and lower plates, can be thin or narrow to further assist the product as it exits to separate into smaller pieces rather than binding together in a continuous mass or sheet. The interior channel 904 of the cooking plate assembly 900 through which the product travels can have a graduated narrowing in thickness from the entry portal to the exit portal. The exit portal has a thin slit or slot like cross section where the width is more than five times the length of the height. The graduated spacing between the upper and lower cooking plates are such that spacing between the plates get gradually less from the entry portal to the exit portal such that for one implementation the ratio of the height between the exit portal and the entry portal is 3-4 as opposed to 1:1. The distance between the two plates at the exit portal (height of the exit portal) is dependent on the thickness of the slice product being extruded through the horn, e.g. if the sliced meat has a thickness of 6 mm, the height of the exit portal is approximately 5-7 mm. Therefore, the exit portal has a height such that the product as it exits maintains separation of the original pieces and doesn't cling together or overlap as they are being extruded through the cooking horn. If the exit portal has a height that is much less than the product slice thickness then the pressure would build up for the inlet stream and within the cooking horn.

The upper and lower plates have upper and lower interior surfaces, which contact the product as the product flows through the interior channel 904. The upper surface of the interior channel and the lower surface of the interior channel slope inwardly one with respect to the other, thereby having a graduated narrowing in thickness or height from the entry portal to the exit portal. The upper plate's upper surface (not shown) is essentially the mirror image of the lower plate's lower surface 902. The narrowing thickness could result in an increased pressure; however, this is counteracted by the reduced pressure under which the product is being pumped through the interior channel, and the non-stick, low-resistance surface (low-friction) of the upper and lower surfaces of the interior channel.

The spacing between the upper plated and the lower plate is defined by the elongated spacer gaskets 916 and 917, which have a graduated thickness that reduces gradually along the length of the elongated spacer gasket from a proximal end 919 to a distal end 921. FIG. 9B illustrates the interior channel 904 and the lengthwise graduation in thickness of the lateral spacer gaskets 916 and 917. The elongated lateral spacer gaskets have lengthwise upper and lower ridges 901 and 903 that protrude from the upper and lower surfaces 905 and 907 of the spacer gaskets respectively; and the upper and lower ridges extend along interior side upper and lower edges, respectively, of the spacer gaskets. The upper and lower ridges of the spacer gaskets project into and fit within an upper elongated lengthwise groove in the upper plate and a lower elongated lengthwise grooves in the lower and upper plates respectively (note: the opposing side illustrates the upper plate and lower plate having the upper and lower elongated lengthwise grooves, 909 and 911, which are a mirror image), thereby forming an interlocking seal between the spacer gasket and the upper and lower plates.

The interior surfaces of the upper and lower plates are cooking surfaces of the interior channel and are heated by induction heating. The upper plate's upper surface (not shown) is essentially the mirror image of the lower plate's lower surface 902. An important feature of the induction heating process is that the heat is generated inside the object itself, instead of by an external heat source via heat conduction. Therefore, objects can be heated very rapidly. In addition there need not be any external contact between the induction element and the interior cooking surface. The interior cooking surface of the interior channel of the cooking plate through which the product travels is constructed of a material that provides a non-stick low-resistance (low-friction) surface so that the product as it is extruded through the cooking plate is conveyed through at a faster rate such that the product doesn't back up, thereby assisting the product to not form a continuous mass or sheet.

The implementation as illustrated in FIG. 9 is configured to prevent the product from cooking together as it travels through the horn. As product progresses through horn the cross section of the horn is gradually changing (the height or thickness is gradually becoming smaller) and the velocity of the product traveling through the horn changes and creates separation of the individual pieces. The objective is to produce a thin loose open layer of the extrudate, whereby there are spaces or openings between the pieces. The is accomplished by lessened pressure in horn, intensive heat using inductive heating rather than steam or conductive heat, and a coated cooking plate to reduce friction and sticking. The product cooks more with the implementation illustrated in FIG. 9, than the other implementations illustrated in FIGS. 1-8. With the implementation illustrated in FIG. 9, the product is cooked down significantly such that the weight of the product may be decreased by as much as 70% from the input weight of the product. The implementation as illustrated in FIG. 9 operates at a higher temperature than the other implementations. The induction heating coil is mounted on top and bottom of horn assembly, where the horn is sandwiched by the two coils. The coil is connected to a high-frequency power supply causing the coil to generate a magnetic field and the metal based horn is within the magnetic field being generated whereby eddy currents are generated in the horn and the horn tries to resist the field whereby the cooking plate gets very hot in a very short period of time. Induction generators can work in a frequency range from 100 kHz up to 10 MHz. More commonly, heating devices with induction heating control have a frequency range of 100 Hz to 200 kHz. The frequency chosen is based on the heating plate material properties and thickness.

Also, as discussed, there is a coating on the interior surface of the cooking plate to reduce friction and aid in sanitation. The heat transfer coefficient is improved over other implementations. The intake diameter of the input pipe feeding the horn should be appropriately sized in combination with the force of the pump to reduce pressure. The distance between the cooking plates and the angle of the taper will depend on the type of the product is being processed and the flow rate. The representative types of product being processed by this configuration can include, Ground meat, Pork Belly (bacon bits) and beef jerky. The cooking plate assembly can have an exterior non-conductive plate covering the coils.

Referring to FIGS. 9G through 9N and 9Q through 9Y, a cooking horn assembly is illustrated that is very similar to the cooking horn assembly illustrated in FIGS. 9A and 9B. The cooking horn assembly 940 is attached to an entry nozzle 942 as illustrated in 9H and 9I. A further detail of the cooking horn is provide in FIG. 9G, which illustrates the entry nozzle 947 and the cooking plate assembly 944. The cooking plate assembly 944 includes an upper cooking plate 952 and a lower cooking plate 954 with a graduated spacer 950 there between. Similar to the cooking plate assembly illustrated in FIGS. 9A and 9B, the upper 952 and lower 954 plates and the lateral spacer gaskets 950 define an interior channel that extends from an entry portal or entry opening to an exit portal or exit opening 948. The lateral spacer gaskets 950 can have a wedge shaped geometry in order to provide the graduated spacing. The thickness or height of the exit portal, defined by the spacing between the upper and lower plates, can be thin or narrow to further assist the product as it exits to separate into smaller pieces rather than binding together in a continuous mass or sheet.

Similar to the implementation illustrated in FIGS. 9A and 9B, this implementation as illustrated in FIG. 9G, has an interior channel of the cooking plate assembly through which the product travels and has a graduated narrowing in thickness from the entry portal to the exit portal. The exit portal has a thin slit or slot like cross section where the width is more than five times the length of the height. The graduated spacing between the upper and lower cooking plates are such that spacing between the plates get gradually less from the entry portal to the exit portal such that for one implementation the ratio of the height between the exit portal and the entry portal is 3-4 as opposed to 1:1 and the ratio of the width of entry portal and exit portal is 0.45-0.67 as opposed to 1:1. The implementation illustrated in FIG. 9G includes upper and lower cooking plates that widen as they extend toward the exit portal, results in a widening of the interior channel. Therefore, the spacing between the spacers also increases with the widening plates and widening interior channel.

The distance between the two plates at the exit portal (height of the exit portal) is dependent on the thickness of the slice product being extruded through the horn, e.g. if the sliced meat has a thickness of 6 mm, the height of the exit portal is approximately 5-7 mm. Therefore, the exit portal has a height such that the product as it exits maintains separation of the original pieces and doesn't cling together or overlap as they are being extruded through the cooking horn. If the exit portal has a height that is much less than the product slice thickness then the pressure would build up for the inlet stream and within the cooking horn.

The upper and lower plates have upper and lower interior surfaces, which contact the product as the product flows through the interior channel. The upper surface of the interior channel and the lower surface of the interior channel slope inwardly one with respect to the other, thereby having a graduated narrowing in thickness or height from the entry portal to the exit portal. The upper plate's upper surface is essentially the mirror image of the lower plate's lower surface. The narrowing thickness could result in an increased pressure; however, this is counteracted by the reduced pressure under which the product is being pumped through the interior channel and/or a widening of the channel, and the non-stick, low-resistance surface (low-friction) of the upper and lower surfaces of the interior channel.

The spacing between the upper plated and the lower plate is defined by the elongated spacer gaskets 950, which have a graduated thickness that reduces gradually along the length of the elongated spacer gasket from a proximal end to a distal end. Similar to the implementation in FIGS. 9A and 9B, the implementation in FIG. 9G has the elongated lateral spacer gaskets and has lengthwise upper and lower ridges that protrude from the upper and lower surfaces of the spacer gaskets respectively; and the upper and lower ridges extend along interior side upper and lower edges, respectively, of the spacer gaskets. The upper and lower ridges of the spacer gaskets project into and fit within an upper elongated lengthwise groove in the upper plate and a lower elongated lengthwise grooves in the lower and upper plates respectively, thereby forming an interlocking seal between the spacer gasket and the upper and lower plates.

The interior surfaces of the upper and lower plates are cooking surfaces of the interior channel and are heated by induction heating. The upper plate's upper surface is essentially the mirror image of the lower plate's lower surface. An important feature of the induction heating process is that the heat is generated inside the object itself by non-contacting induction, instead of by an external contacting heat source via heat conduction. Therefore, objects can be heated very rapidly. In addition there need not be any external contact between the induction element and the interior cooking surface. The interior cooking surface of the interior channel of the cooking plate through which the product travels is constructed of a material that provides a non-stick low-resistance (low-friction) surface so that the product as it is extruded through the cooking plate is conveyed through at a faster rate such that the product doesn't back up, thereby assisting the product to not form a continuous mass or sheet.

The implementation as illustrated in FIG. 9 is configured to prevent the product from cooking together as it travels through the horn. As product progresses through horn the cross section of the horn is gradually changing (the height or thickness is gradually becoming smaller) and the velocity of the product traveling through the horn changes and creates separation of the individual pieces. The objective is to produce a thin loose open layer of the extrudate, whereby there are spaces or openings between the pieces. The is accomplished by lessened pressure in horn, intensive heat using inductive heating rather than steam or conductive heat, and a coated cooking plate to reduce friction and sticking. The product cooks more with the implementation illustrated in FIG. 9, than the other implementations illustrated in FIGS. 1-8. With the implementation illustrated in FIG. 9, the product is cooked down significantly such that the weight of the product may be decreased by as much as 70% from the input weight of the product. The implementation as illustrated in FIG. 9 operates at a higher temperature than the other implementations. The induction heating coil is mounted on top and bottom of horn assembly, where the horn is sandwiched by the two coils. The coil is connected to a high-frequency power supply causing the coil to generate a magnetic field and the metal based horn is within the magnetic field being generated whereby eddy currents are generated in the horn and the horn tries to resist the field whereby the cooking plate gets very hot in a very short period of time. Induction generators can work in a frequency range from 100 kHz up to 10 MHz. More commonly, heating devices with induction heating control have a frequency range of 100 Hz to 200 kHz. The frequency chosen is based on the heating plate material properties and thickness.

Also, as discussed, there is a coating on the interior surface of the cooking plate to reduce friction and aid in sanitation. The heat transfer coefficient is improved over other implementations.

Figure 9J:
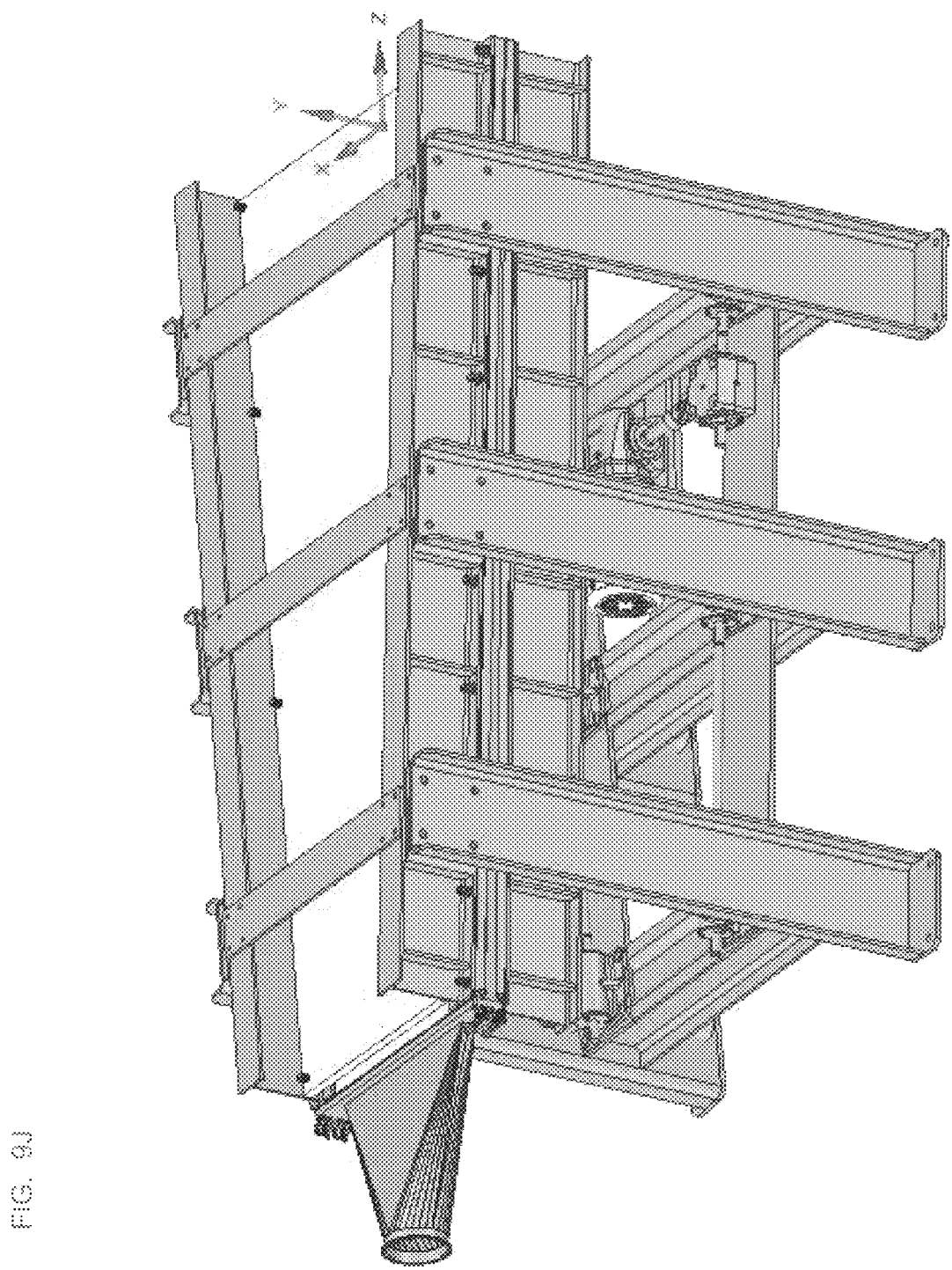
FIG. 9J is an illustration of another cooking plate assembly mounted on a bracket assembly.

FIG. 9J illustrates the cooking horn mounted in a mounting bracket 956. The cooking horn is mounted adjacent an induction coil assembly 958.

Figure 9K:
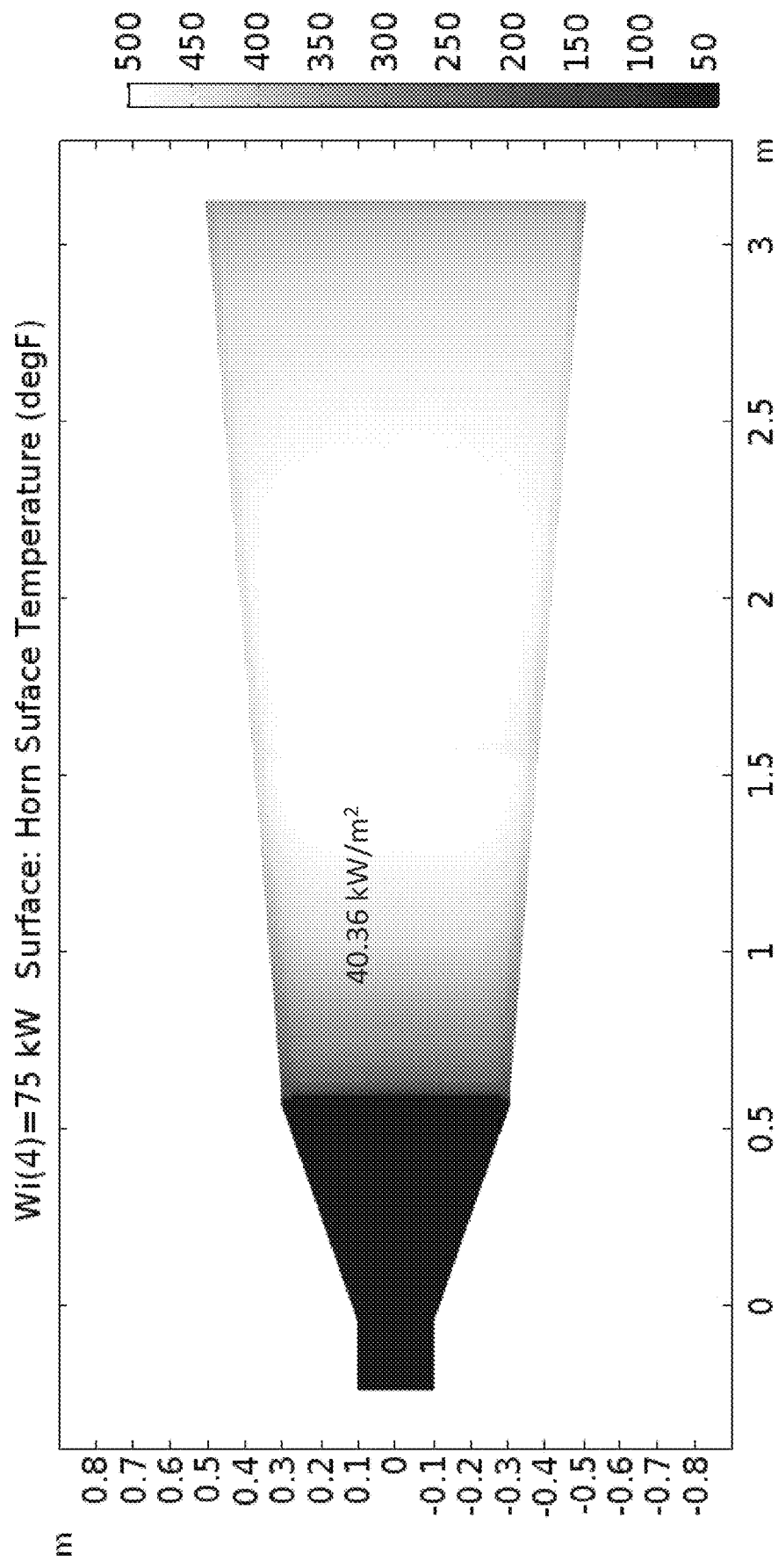
FIG. 9K is an illustration of the cooking plate surface temperature.
Figure 9L:
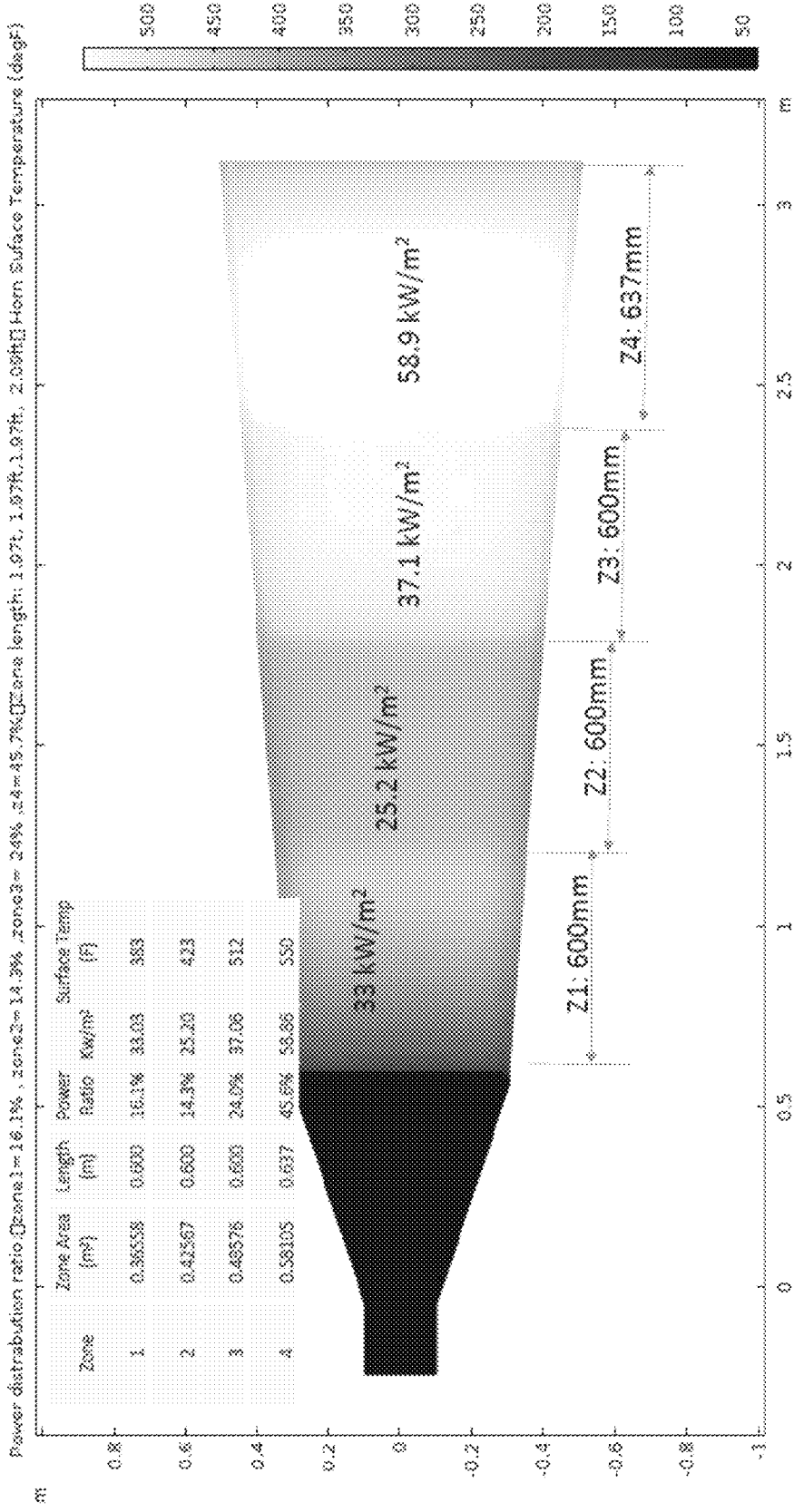
FIG. 9L is an illustration of the cooking plate surface temperature in the various power distribution zones.
Figure 9M:
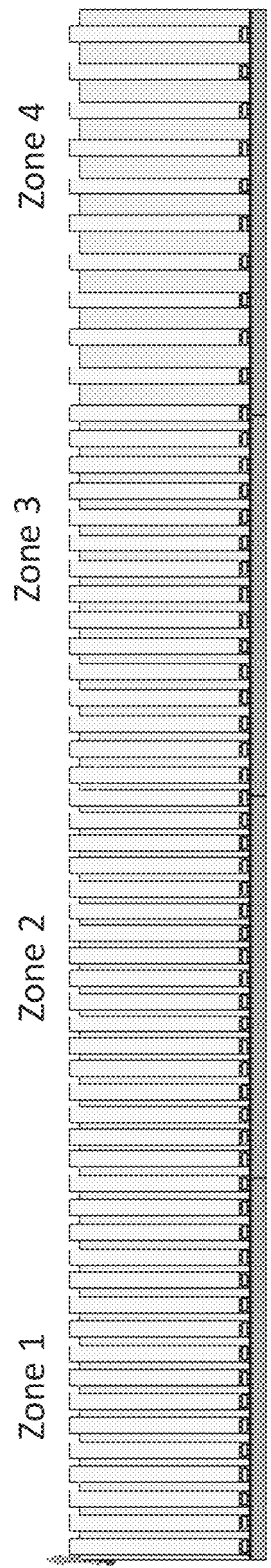
FIG. 9M is an illustration of a side view of the induction coil design illustrating the graduated spacing between the coil elements as you transition from Zone 1 through Zone 4.
Figure 9T:
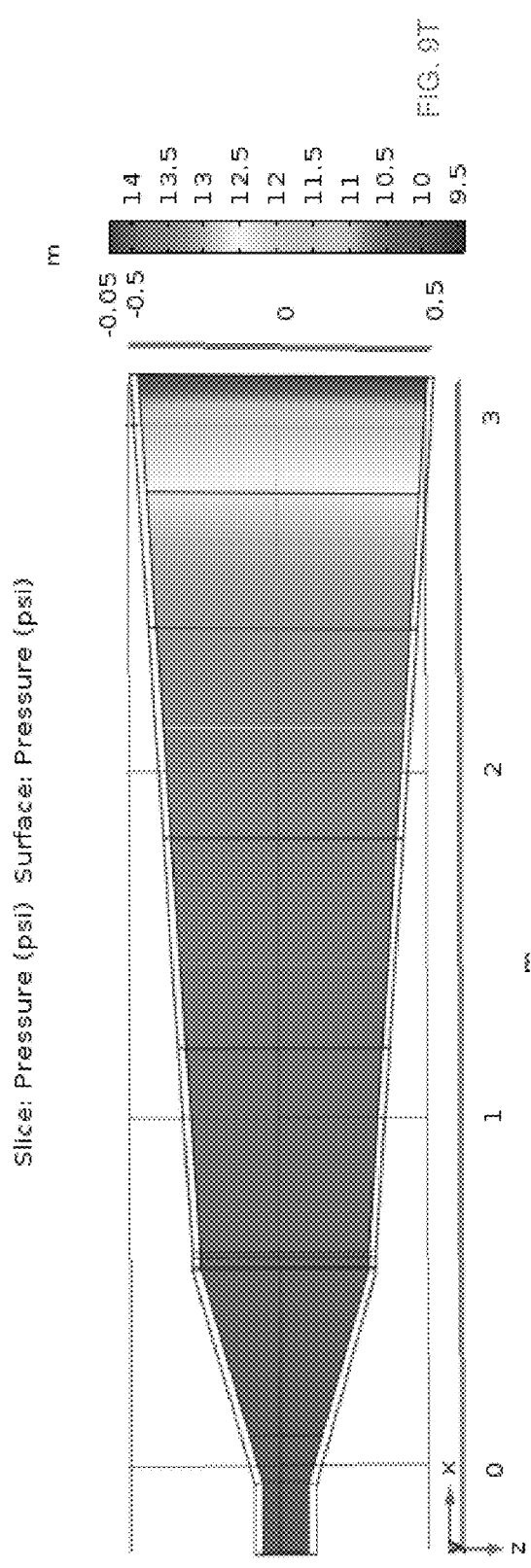
FIG. 9T is a pressure profile.
Figure 9U:
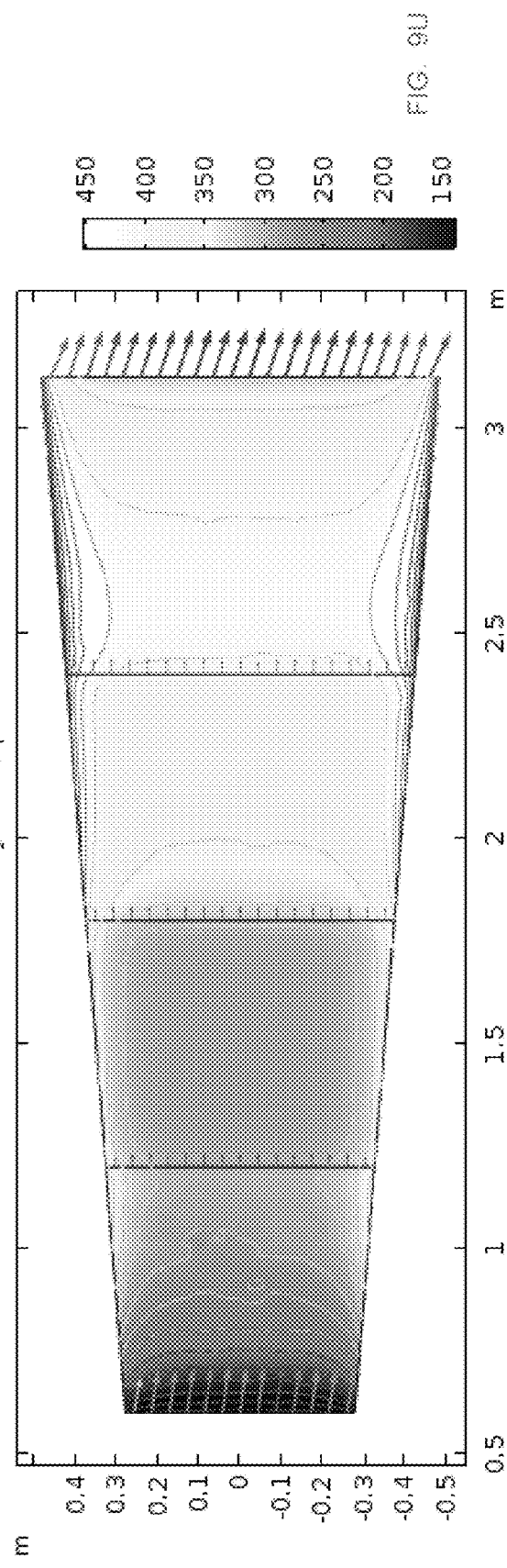
FIG. 9U is a plate inside temperature profile.
Figure 9X:
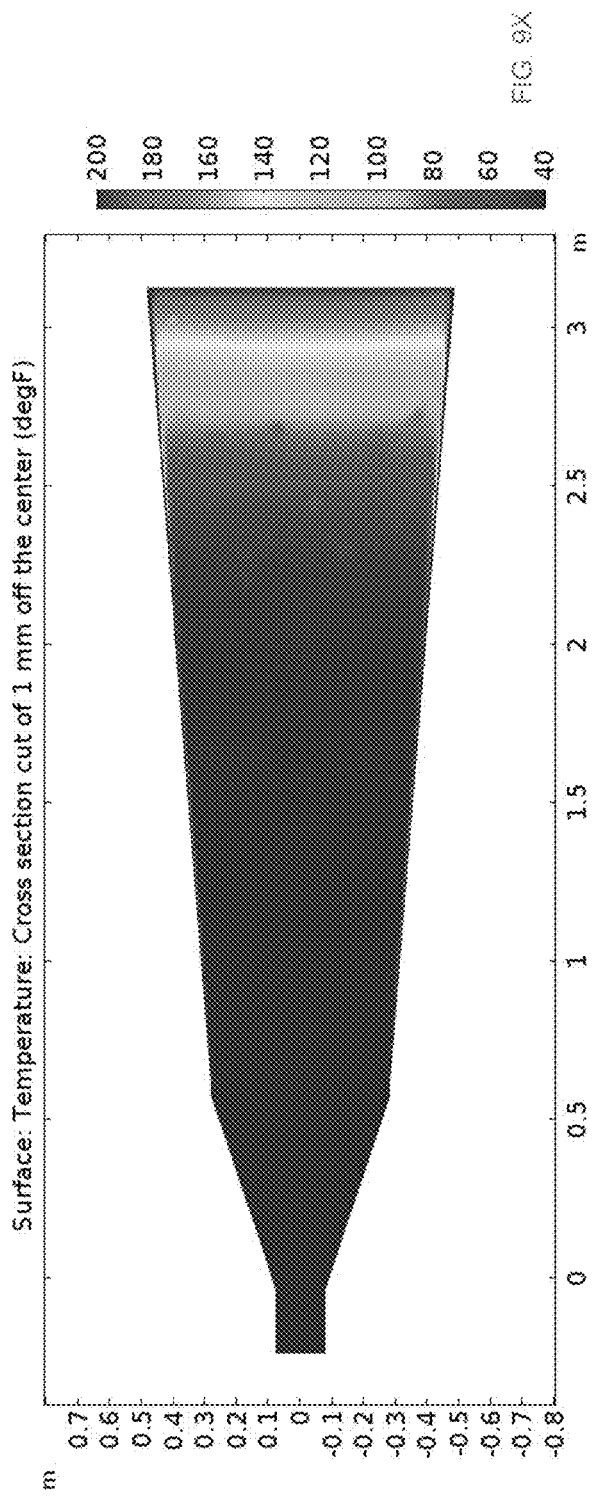
FIG. 9X is an illustration of a temperature profile 1 mm off the center.
Figure 9Y:
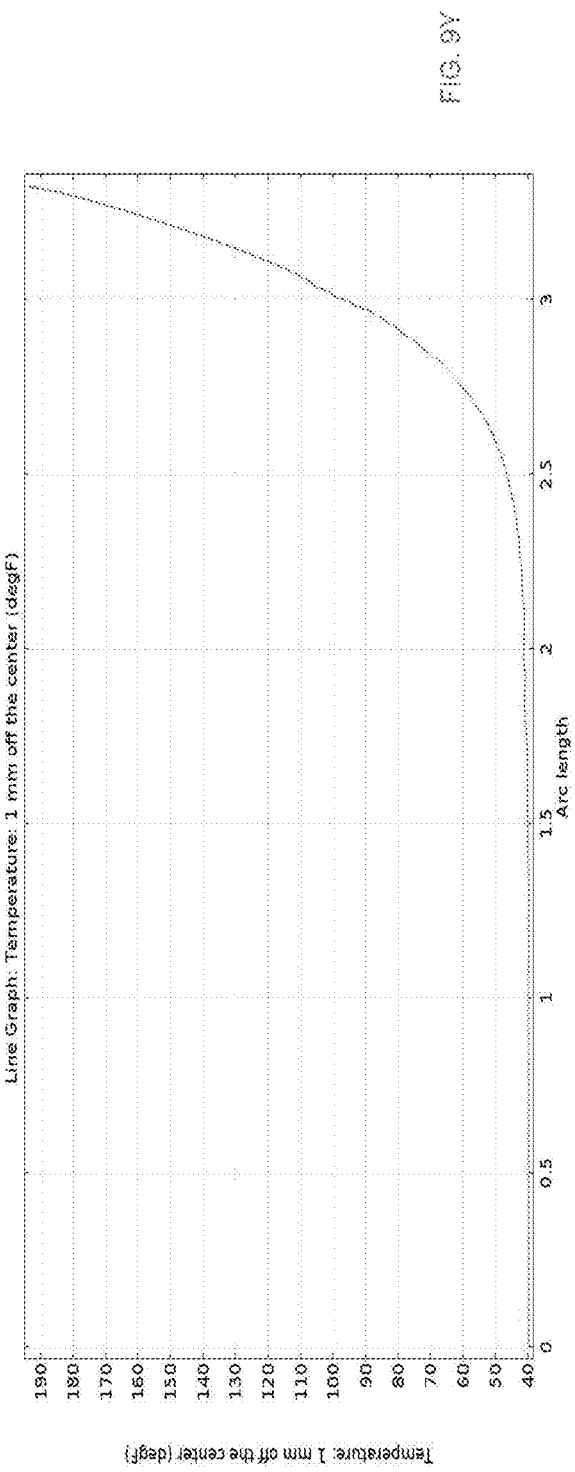
FIG. 9Y is an illustration of a temperature profile 1 mm off the center.

FIG. 9K illustrates the surface temperature under uniform power distribution. FIG. 9L illustrates the power distribution ratio and the surface temperature across the various zones of the cooking surface. FIGS. 9M and 9N illustrate the serpentine induction coil configuration. FIG. 9M illustrates a sectional view of the induction coils 960, which illustrates the variation in spacing between the coils from the entry end to the exit end. The spacing 963 between the coil element as it follows the serpentine pattern widens as it extends toward the exit end. FIG. 9N further illustrates the increase in the spacing 962 between the runs of the induction element 960. The induction coil (element) is mounted on a plate 958 of the induction coil assembly. FIG. 9Q illustrates the thermal profile. The surface velocity magnitude of a product traveling through the horn is illustrated in FIGS. 9R and 9S. The surface pressure is illustrated in FIG. 9T. FIG. 9U illustrates a simulation of the temperature profile. FIGS. 9V through 9Y illustrate a center line cross section temperature profile.

Figure 10:
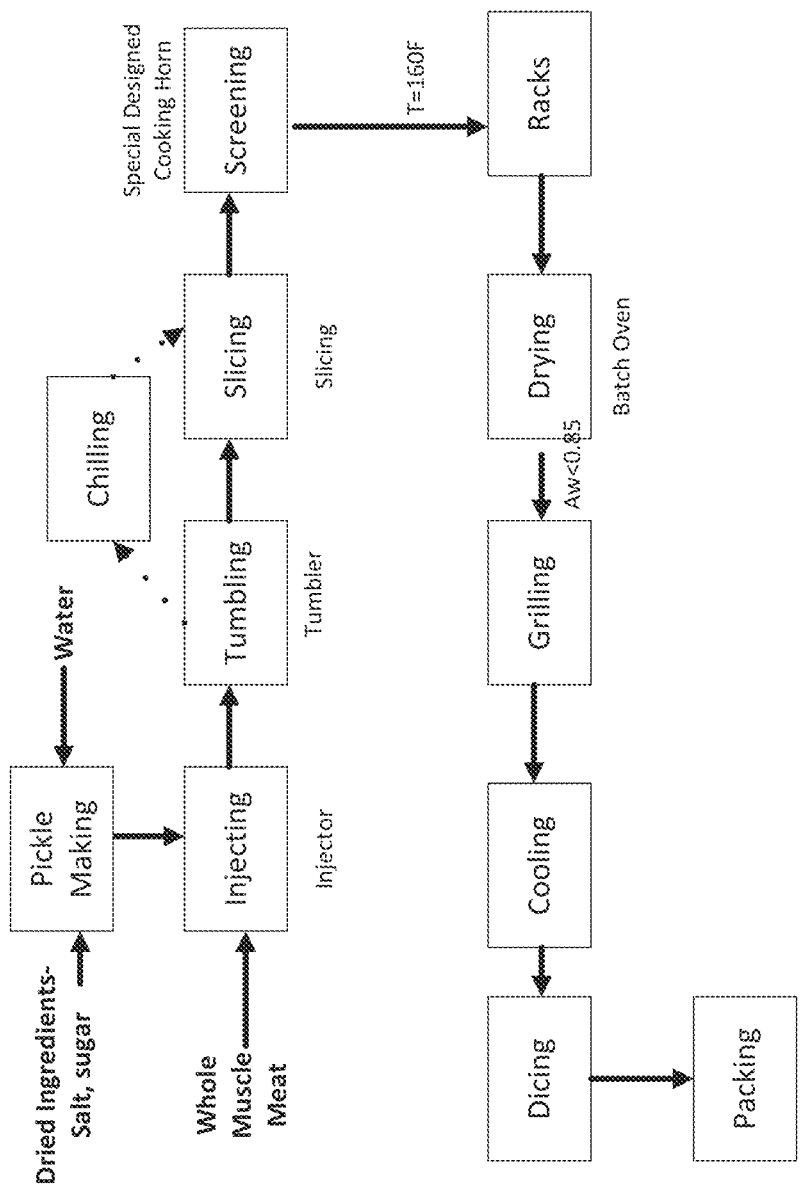
FIG. 10 is an illustration of a non-continuous process.
Figure 11:
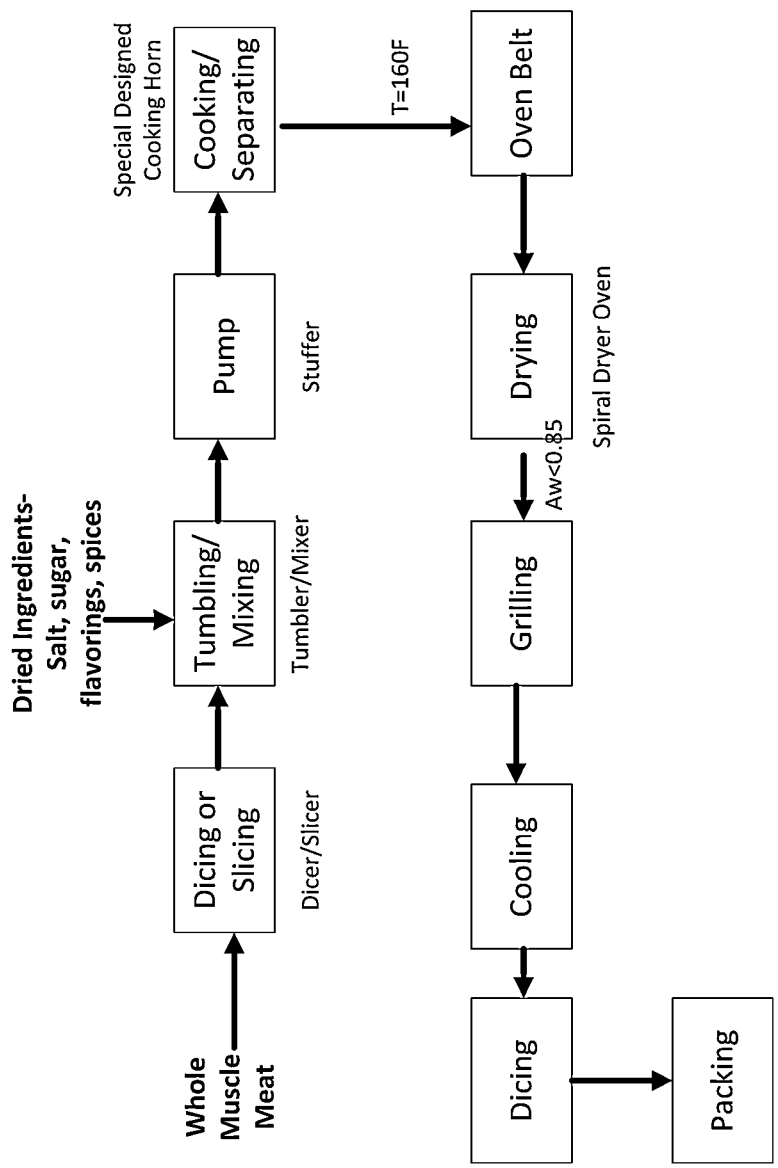
FIG. 11 is an illustration of the cooking process.
Figure 12A:
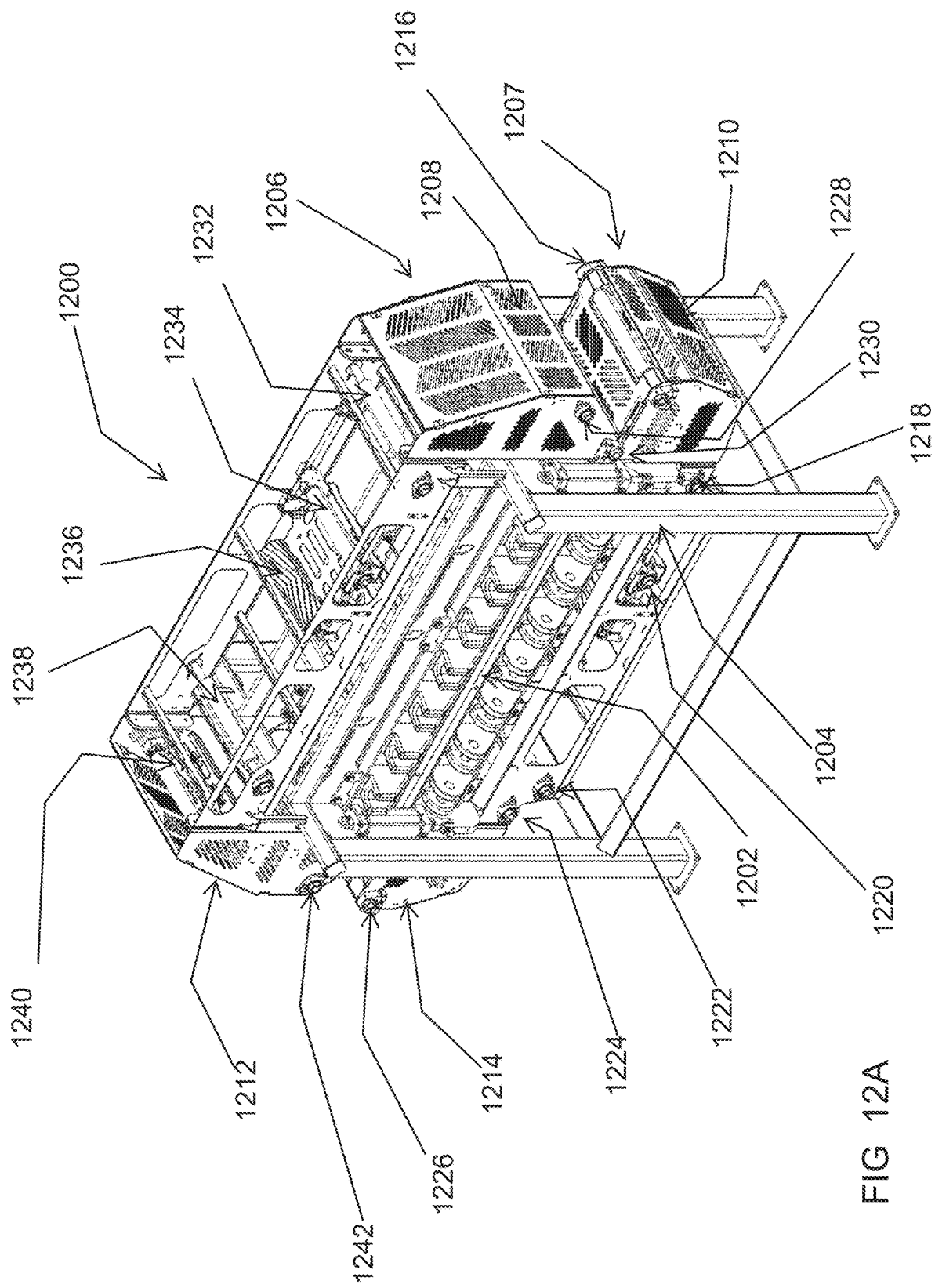
FIG. 12A through 12I, is an illustration of a cooking plate assembly in combination with a conveyance system.
Figure 12B:
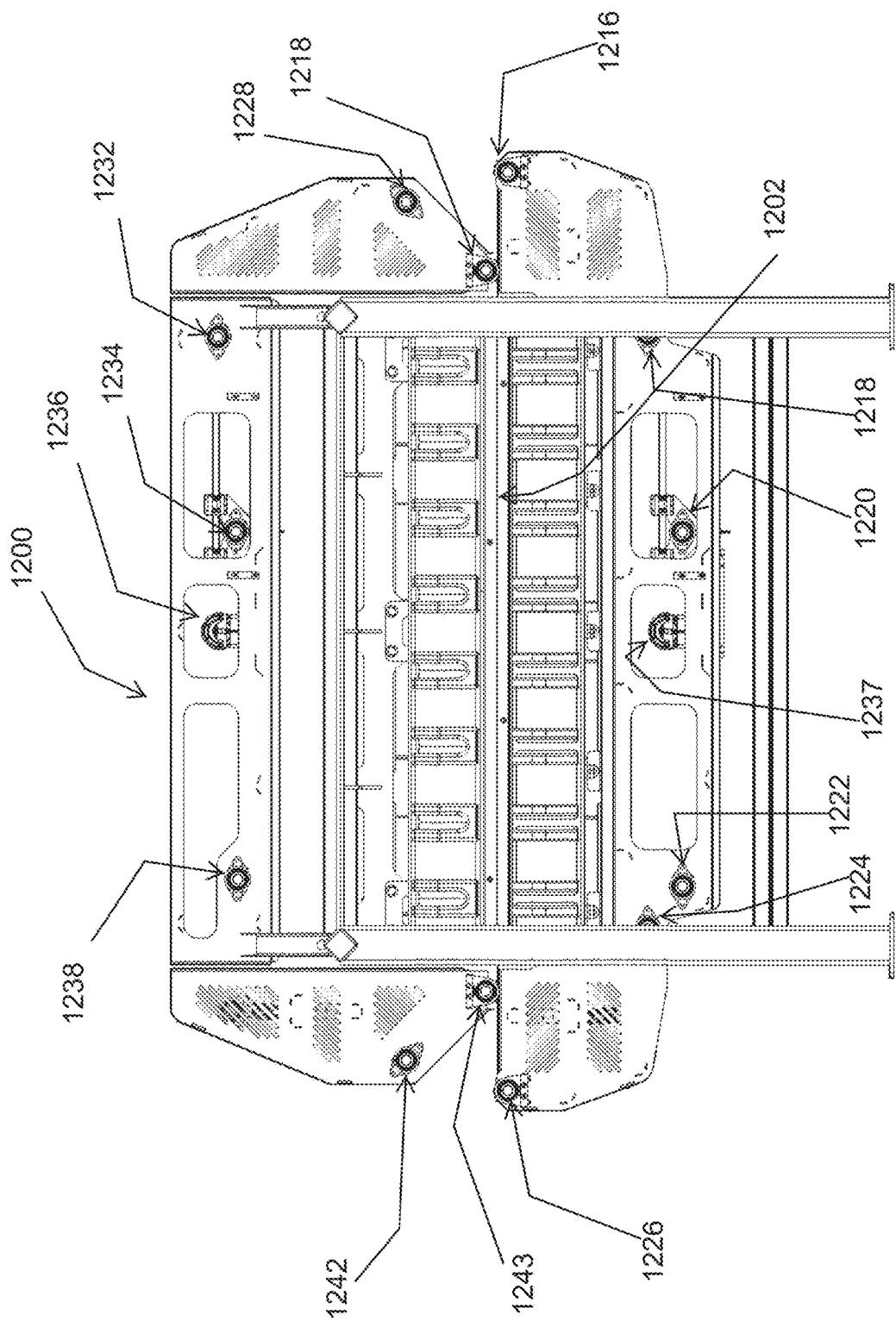
Figure 12C:
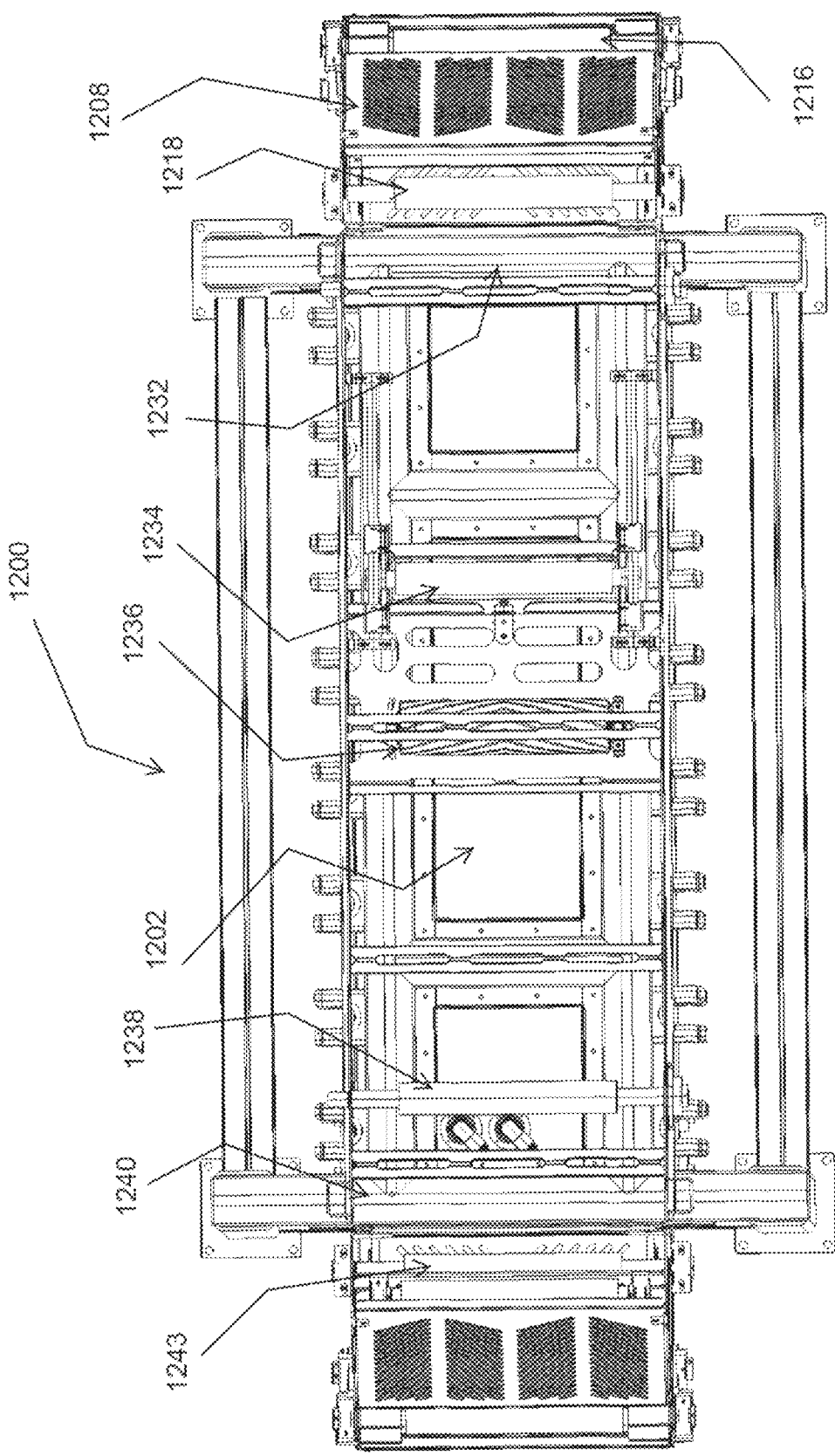
Figure 12D:
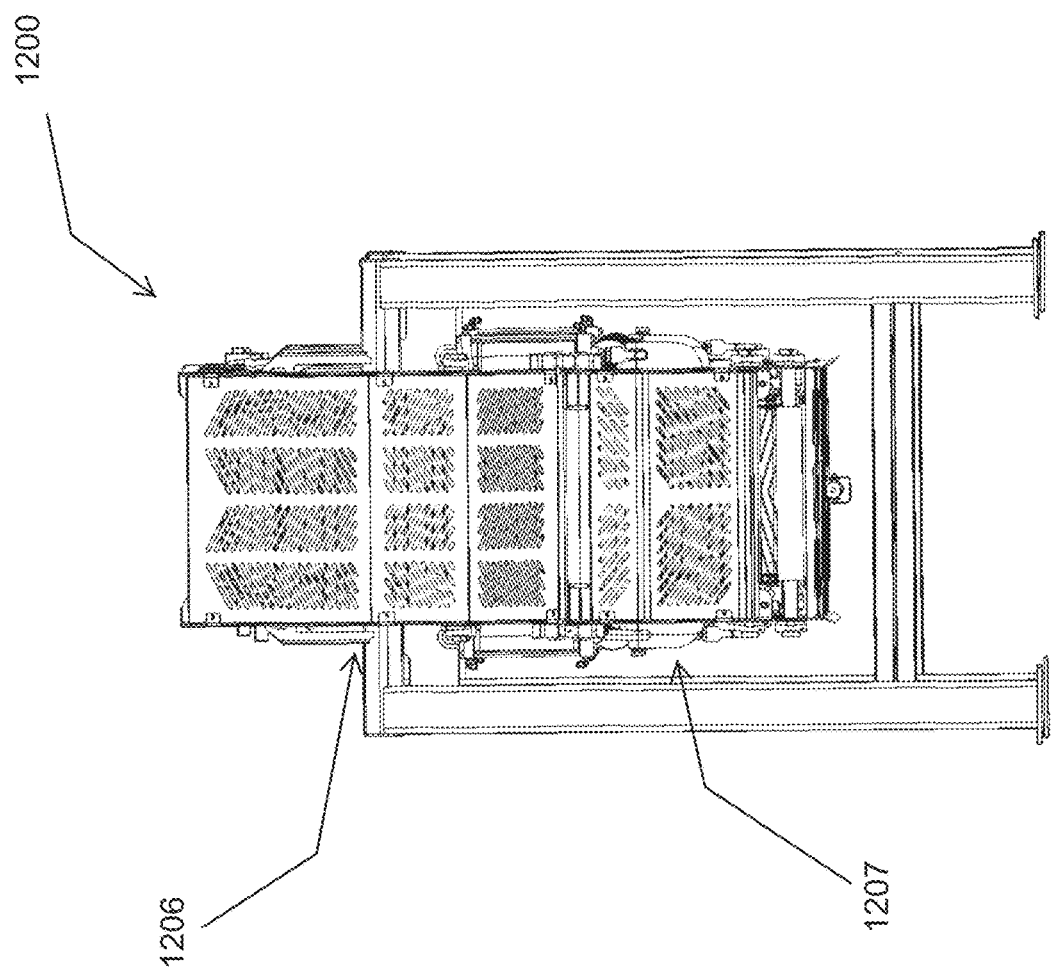
Figure 12E:
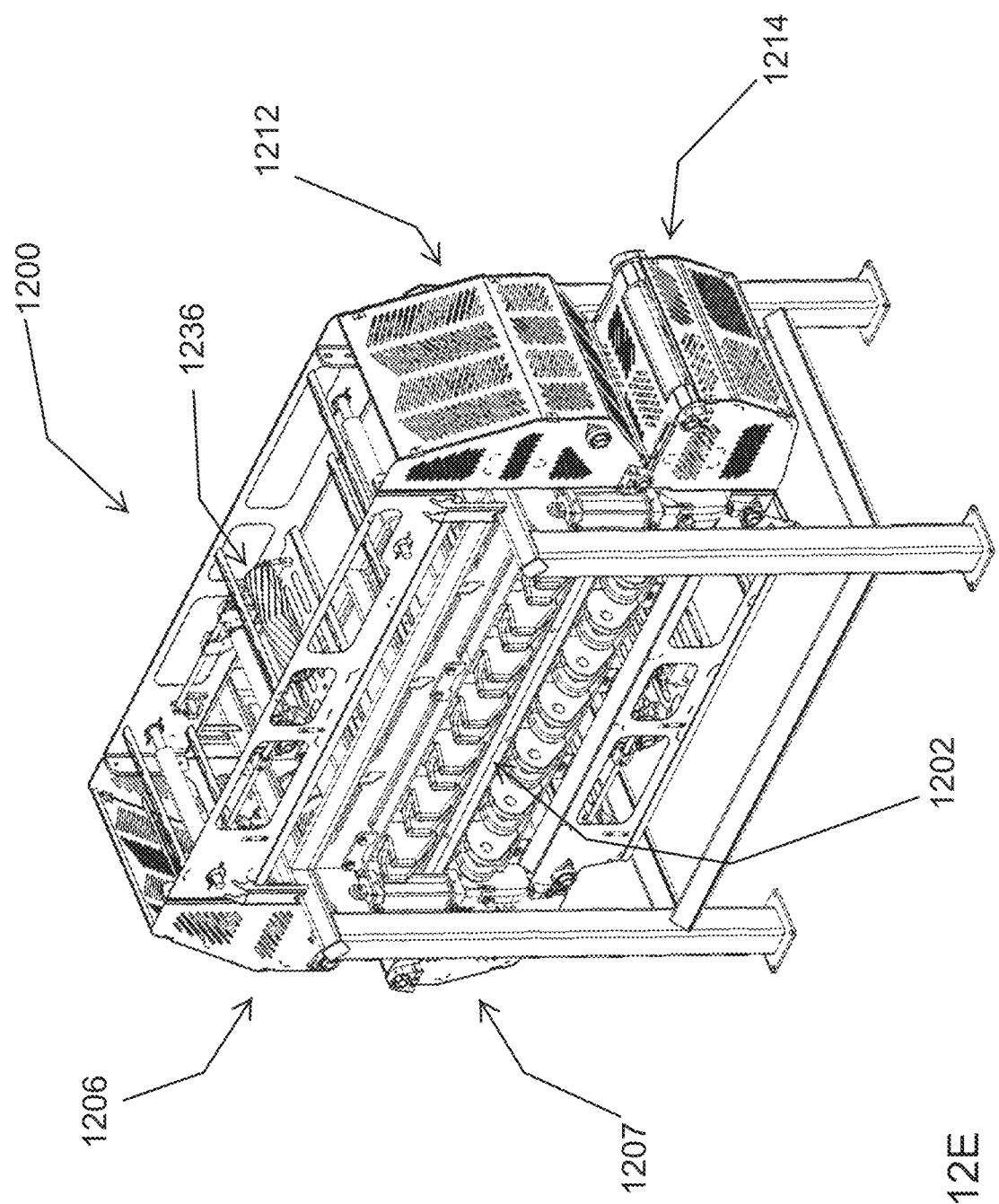
Figure 12F:
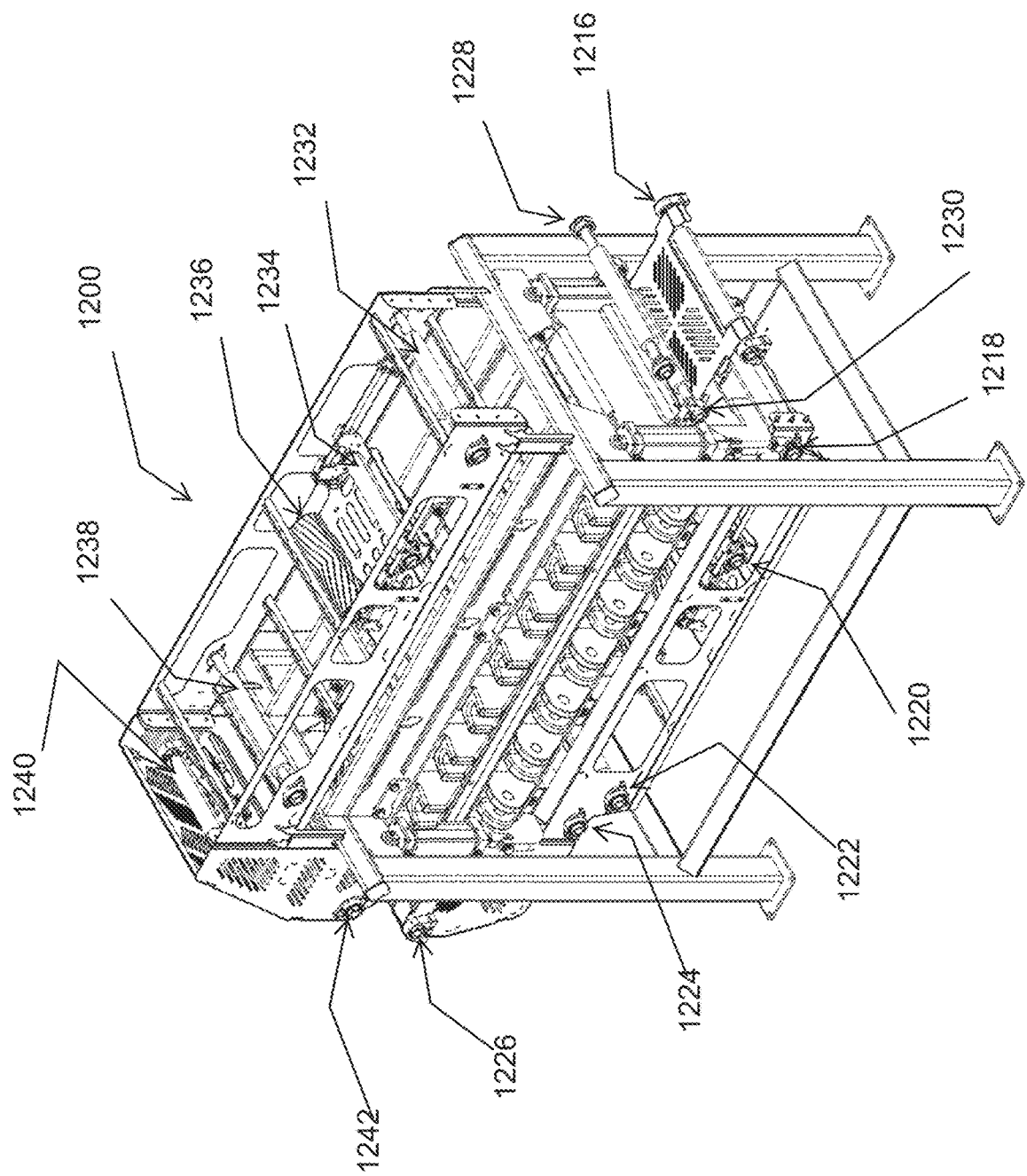
Figure 12G:
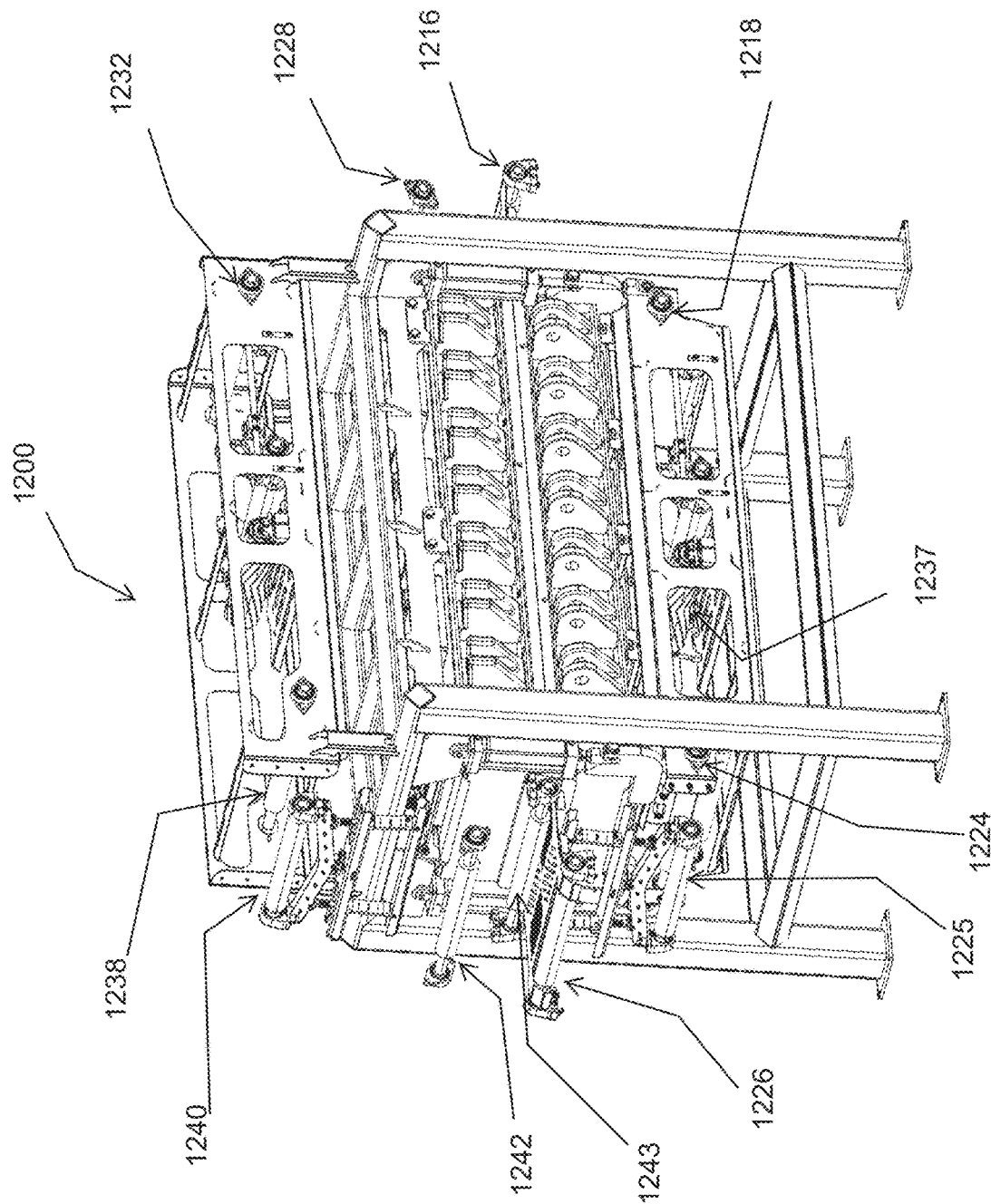
Figure 12H:
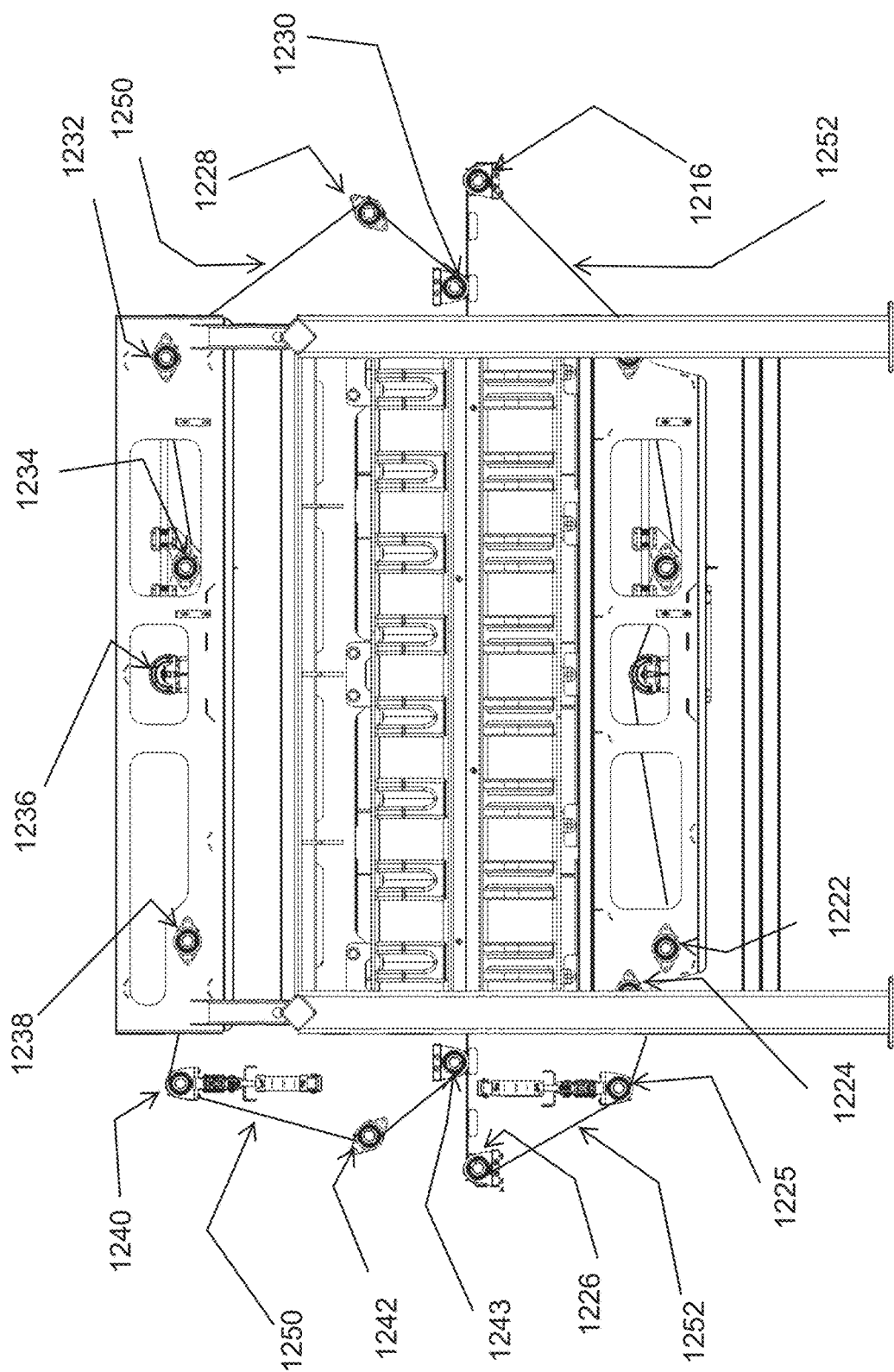
Figure 12:
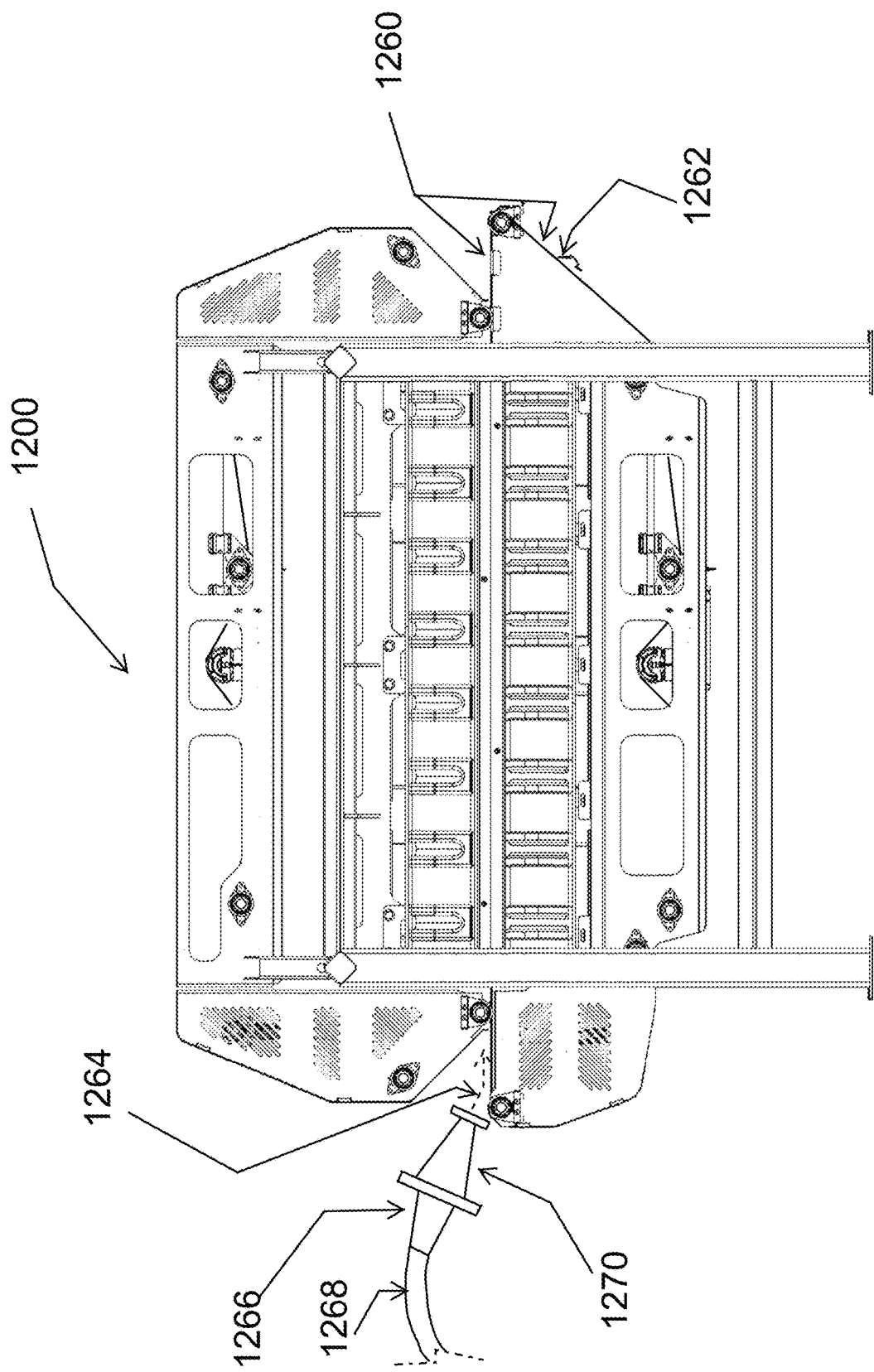

FIGS. 10 and 11 illustrate non-continuous and continuous process flows. The continuous process flow better utilizes the whole muscle meat and provides for a shorter process time and greater process efficiency. The continuous process requires less labor and less energy consumption, therefore, resulting in a lower cost process. The cooking horn in this process is utilized for cooking and separating. The cooking plate assembly 900 shown in FIG. 9A is configured to produce a product that is not a continuous mass or sheet, but rather to produce and extrude an output product that separates into smaller pieces as it exits the cooking plate assembly 900. Examples of products that can be produced with this implementation include ground meat, beef jerky and bacon bit products. The cooking is provided by induction heating rather than traditional conduction heating. The product is pumped into the horn at a lower pressure than typical so that pressure doesn't build sufficiently to slow down the flow of the product.

In the continuous process seen in FIG. 11, the whole muscle meat, having an original product weight, is diced and/or sliced at the beginning of the process. The diced/sliced product is tumbled and/or mixed with dried seasoning ingredients including salt, sugar, flavoring and spices. The tumbled/mixed product is pumped into a cooking horn. The various cooking horn implementations are illustrated in FIGS. 9A through 9N are configured appropriately for this continuous process as shown in FIG. 11. The cooking horn will cook and promote maintaining separation of the product in the original smaller pieces rather than extruding a continuous mass and/or sheet of extruded product. The product is pumped into the horn at a lower pressure than typical so that pressure doesn't build sufficiently to slow down the flow of the product. As previously described, a more efficient inductive heating element can be utilized with the continuous process as illustrated. The temperature of the extruded product can exit the horn at a temperature of about 160 degrees Fahrenheit. The surface temperature of the extruded product could reach water boiling temperature in a very short period of time—within 10 seconds. The extruded product as it exits the horn falls onto an oven conveyor belt where it is conveyed through an oven for drying the product. One implementation of the oven is a spiral oven for drying. The dried product is then transitioned to the grilling step. The dried product should be less than 85% of the original product weight. The grilled product is cooled and is further size reduced as needed. One implementation of size reduction is dicing the cooled product. The product is packaged for further distribution.

Table 1 below provides test data from an R&D Test Unit and a Production design.

TABLE 1

|  | R&D Test Unit | Production Design | | | Plate Design | | | | |
| --- | --- | --- | --- | --- | --- | --- | --- | --- | --- |
| Raw Production (lb/hr) | 750 | 4500 | | | | | | | |
| Raw Production (kg/s) | 0.094 | 0.567 | | | | | | | |
| Density (kg/m^3) | 1010 Density (kg/m^3) | 1010 | | | | | | | |
| Inelt Temperature (F.) | 36 | 36 | | | | | | | |
| Outlet Temperature (F.) | 180 | 180 | | | | | | | |
| Bacon Heat Capacity(kJ/kg.C) | 3.02 | 3.02 | | | | | | | |
| Water Latent Heat Vaporization (kJ/kg) | 1950 | 1950 | | | | | | | |
| Vaporiztion Loss | 1% | 1% | | | | | | | |
| Cookling Yield | 30% | 30% | | | | | | | |
| Finish Throughtput (lb/hr) | 225 | 1350 | | | | | | | |
| Feed Section | | | | | | | | | |
| Infeed Pipe Diameter (in) | 2.5 | 6 | | | | | | | |
| Cross Section of pipe area (cm^2) | 31.7 | 182.4 | | | | | | | |
| Outlet Width difference with diameter (in) | 1.75 | 8 | | | | | | | |
| Feed horn Length (in) | 5.5 | 18 | | | | | | | |
| Angle (deg) | 17.7 | 24.0 | | | | | | | |
| Cross section area reduce ratio (I/O) | 0.912 | 1.012 | | | | | | | |
| Heating Section | | | | | | | | | |
| Inlet Width (in) | 6 in | 22 in | | | | | | | |
| Inlet Thinkness (mm) | 19.05 .075 | 33.02 | 1.3 | | | | | | |
| Inlet Cross section Area (cm^2) | 29.03 | 184.52 | | | | | | | |
| Out Width (in) | 9 | 38 | | | | | | | |
| Out Thickness (mm) | 4 | 4 | | | | | | | |
| Out Cross section Area (cm^2) | 9.14 | 38.61 | | | | | | | |
| Inlet/outlet area ration | 0.315 | 0.209 | | | | | | | |
| Length (ft) | 4 | 8 Section | | | | | | | |
|  |  |  |  |  | Length | Zone | Area (m) | Total Length | Power Ratio | Kw/ m^2 | Temp (F.) |
| Wide alpha | 0.3123983 | 0.083141232 | | | | | | | |
|  |  |  | Zone | 1 | 1.97 | 0.36558 | 0.600 | 1.200456 | 16.1% | 33.03 | 383 |
| Height Angle | 0.35 | 0.34 | | 2 | 1.97 | 0.42567 | 0.600 | 1.900912 | 14.3% | 25.20 | 423 |
| Top side Heating area (m^2) | 0.232 | 1.858 | | 3 | 1.97 | 0.48576 | 0.600 | 2.401368 | 24.0% | 37.06 | 512 |
| Btn side Heating area (m^2) | 0.232 | 1.858 | | 4 | 2.09 | 0.56105 | 0.637 | 3.0384 | 45.6% | 58.86 | 550 |
| Total heating Area (m^2) | 0.465 | 53.117 | 3.716 | | | | | | |
| Avg dwell Time (s) | 24.9 | 46.5 | | | | | | | |
| Ratio of (lb/m^2 heating area) | 1615 | 1211 | | | | | | | |
| Bacon bit Speed from outlet (m/s) | 0.102 | 0.145 | | | | | | | |
| Ratio of output rate per heat area (lb/m^2/s) | 64.91 | 24.99 | 40.3647 | | | | | | |
| Act. Energy require (kw) | 25 | 148 | | | | | | | |
| Power Density (kW/m^2) in heating plate | 53.1 | 39.8 | | | | | | | |

TABLE 1-continued

| | R&D Test Unit | Production Design | Plate Design |
|---|---|---|---|
| Power supplier @ 70% eff (kw) | 35 | 211 | |
| One Induction heat unit (kw) | 35 | 250 | |
| Need Unit Induction Heat Units | 1 | 1 | |
| Amperage for 3PH 480 V (A) | 52.85 | 377.5 | |

Referring to FIGS. 12A through 12I, a cooking plate assembly 1200 is illustrated including a cooking plate 1202 mounted on a support frame 1204. The cooking plate 1202 includes a top plate having compression member mounts and tension cylinder mounts. The cooking plate 1202 further includes a bottom plate having compression member mounts and tension cylinder mounts. The cooking plate is mounting in a support frame 1204. The upper and lower plates are compressed together by compression members and tension members. The cooking plate assembly 1200 shown conveys an extrusion that is extruded at a reduced pressure so that a continuous mass or sheet is not formed as it passes through the cooking plate assembly. The interior cooking surface of the interior channel of the cooking plate 1202 through which the product travels is constructed of a material that provides a non-stick low-friction coefficient surface so that the product as it is extruded through the cooking plate assembly is conveyed through at a faster rate such that the product doesn't back up, thereby assisting the product to not form a continuous mass or sheet, but to maintain separation of the original individual pieces.

The thickness or height of the exit portal can be thin or narrow to further assist the product as it exits to maintain separation of the original smaller pieces rather than binding together in a continuous mass or sheet. The thickness of the exit portal also provides a certain product slice thickness. The interior channel of the cooking plate assembly through which the product travels can have a graduated narrowing in thickness from the entry portal to the exit portal. The upper surface of the interior channel and the lower surface of the interior channel are proximately spaced apart and for one implementation, slopes inwardly one with respect to the other, thereby having a graduated narrowing in thickness or height from the entry portal to the exit portal. The narrowing thickness or spacing could result in an increased pressure; however, this is counteracted by the reduced pressure under which the product is being pumped through the interior channel, and the non-stick, low-resistance surface of the interior channel. In one implementation, the widening of the interior channel can reduce pressure.

For one implementation of the cooking plate, the interior cooking surfaces of the interior channel are heated by induction heating. The cooking plate utilizes electrically conducting coils that generate eddy currents that cause the conductive plates to heat up. Induction heating is a non-contact method of heating a conductive body (i.e. plates) by utilizing a strong magnetic field from the specially designed coils. The coils do not contact the conductive plates. The conductive plates heat up responsive to its proximity to the strong magnetic field. The heated plates contact and heat up the meat. The advantage of an inductive heating system and method is that the heating temperature of the plates can reach a very high temperature (approximately 500 degrees F.) ins a short period of time and the surface temperature of the plates can be controlled by adjusting the power output to the coils. An induction heater consists of an electromagnet, and an electronic oscillator that passes a high-frequency alternating current (AC) through the electromagnet. The rapidly alternating magnetic field penetrates the object, generating electric currents inside a conductor called eddy currents. The eddy currents flowing through the resistance of the material heat it by Joule heating. In ferromagnetic (and ferromagnetic materials like iron, heat may also be generated by magnetic hysteresis losses. The frequency of current used depends on the object size, material type, coupling (between the work coil and the object to be heated) and the penetration depth. An important feature of the induction heating process is that the heat is generated inside the object itself, instead of by an external heat source via heat conduction. Therefore, objects can be heated very rapidly. In addition there need not be any external contact.

Therefore the interior cooking surface of the cooking plate as disclosed and claimed herein can be heated by induction heating. Induction cooking is quite efficient, which means it puts less waste heat into the surrounding assembly. Induction heating can be quickly turned on and off, and is easily controlled for heating level. Induction cooking provides faster heating, improved thermal efficiency, and more consistent heating than cooking by thermal conduction, with more precise control over the heat provided. Therefore, the heat applied by the interior cooking surface to the product can be more precisely controlled.

As indicated, the narrow thickness between the upper and lower plates could result in an increased pressure, which for one implementation is counteracted by the reduced pressure under which the product is being pumped through the interior channel, and the non-stick, low-resistance surface (low-friction) of the upper and lower surfaces of the interior channel. However, for some thicknesses, the reduced pressure and the low-friction surface isn't sufficient to counteract the increased pressure. However, for one implementation as illustrated in FIGS. 12A through 12H, the increased pressure is addressed by an upper and lower conveyor belt that convey through the extrusion interior channel extending between the plates along the upper and lower cooking plates respectively. The upper and lower conveyors convey in the direction of the flow of the extrusion to thereby assist the flow of extrusion, thereby addressing the increased pressure and potential backup of the extrusion flow. The speed of the upper and lower conveyors are variable to adapt to the pressure of the influx of extrudate, the internal channel pressure, and the consistency of the product.

Also, there is a non-stick coating on the surface of the upper and lower belts that contact the product. The belts are constructed of a material such that the heat transfer coefficient is sufficient to adequately transfer heat from the upper and lower cooking plates to the product being extruded.

The cooking surface of the belts that contacts the product as the belts traverse through the channel in the direction of flow of the interior channel of the cooking plate through which the product travels is constructed of a material that provides a non-stick low-resistance (low-friction) surface so that the product as it is extruded through the cooking plate is conveyed through without substantially impacting the flow and preventing the conveyors from causing the product to backup, thereby assisting the product to not form a continuous mass or sheet. Due to the non-stick surfaces of the conveyor belt, the denaturing of the product by heating, the height of the narrow interior channel, the speed of the belts, and gravity, the product tends to remain on and cling to the lower belt of the lower conveyor and not cling to the upper belt of the upper conveyor.

Referring to FIG. 12A through 12I, a cooking plate assembly 1200 is illustrated including a cooking plate 1202 mounted on a frame 1204. The assembly 1200 includes an upper conveyor having an upper entry end return run 1206 and an upper exit end return run 1212. The assembly 1200 further includes a lower conveyor having a lower entry end return run 1207 and a lower exit end return run 1214. The upper conveyor top run travels over the conveyor pulley rollers 1240, 1238, 1234 and 1232. The upper entry end return run pulleys 1228 and 1230 are covered by a protection shield 1208. The upper exit end return run pulleys 1242 and 1243 are covered by an upper exit end protection shield. The bottom run of the upper conveyor, extends through the interior channel along the upper plates interior surface. The outward facing surface of the upper belt 1250 contacts the product as the product travels through the interior channel extending between the cooking plates. The inward facing surface of the upper belt 1251 extends immediately adjacent the upper plates interior surface. Heat is transferred from the upper plate to the upper belt and the upper belt's outer surface 1250 is heated and contacts the product being extruded through the interior channel. The lower conveyor bottom run travels over the conveyor pulley rollers 1218, 1220, 1222 and 1224. The lower entry end return run pulleys 1216 and 1218 are covered by a protection shield 12010. The lower exit end return run pulleys 1225 and 1226 are covered by an upper exit end protection shield. The top run of the lower conveyor, extends through the interior channel along the lower plates interior surface. The outward facing surface of the upper belt 1252 contacts the product as the product travels through the channel. The inward facing surface of the upper belt 1253 extends immediately adjacent the lower plates interior surface. Heat is transferred from the lower plate to the lower belt and the lower belt's outer surface is heated and contacts the product being extruded through the interior channel. The outer surfaces of the upper and lower belts, 1250 and 1252 respectively, are non-stick material, which is one of metal, Teflon or other comparable non-stick material. For one implementation, scrapper rollers 1236 and 1237 are utilized to remove any remaining product from the outer surface of the belt after traversing through the interior channel.

FIG. 12I provides a further illustration of the cooking plate assembly 1200, where the lower exit end protection shield structure is removed to thereby reveal the lower conveyor belt return run at the exit end. The view in FIG. 12I reveals a scrapper assembly that is mounted between the left and right lower protection shields having a leading edge 1262 positioned to scrap the product from the belt for the product that remains clinging to the belt. The exiting product is collected for further processing. On the product entry end, product is extruded through an extrusion line 1268 and through a compression nozzle 1266 and further through a sheeter nozzle 1270. The sheeter nozzle has an exit opening that is a long narrow opening that extends horizontally and is substantially parallel to the belt of the lower conveyor. Thin non-continuous sheeted product flows out of the exit opening of the sheeter nozzle and onto the belt of the lower conveyor and in the direction as indicated by directional arrow 1264, which is conveyed through the channel between the upper and lower cooking plates.

For one implementation of the technology, an extrusion horn includes an upper cooking plate having an upper interior cooking surface and a lower cooking plate having a lower interior cooking surface, where the upper interior cooking surface and the lower interior cooking surface face each other, and where said upper interior cooking surface is proximately space apart from the lower interior cooking surface with a spacing, where the spacing is defined by a spacer gasket extending lengthwise along the upper and lower cooking plates and said spacer gasket positioned between the upper interior cooking surface and the lower interior cooking surface thereby forming a lengthwise interior extrusion channel having an entry opening and an exit opening. One implementation further includes a conveyor having an endless conveyor belt where one of an upper run of the endless conveyor belt and a lower run of the endless conveyor belt extends lengthwise and conveys through the lengthwise interior extrusion channel.

For one implementation the conveyor is an upper conveyor and where the endless conveyor belt is an upper endless conveyor belt, and where a lower run of the upper endless conveyor belt extends lengthwise and conveys immediately adjacent the upper interior cooking surface and through the lengthwise interior extrusion channel. For yet another implementation, the conveyor is a lower conveyor and where the endless conveyor belt is a lower endless conveyor belt, and where an upper run of the lower endless conveyor belt extends lengthwise and conveys immediately adjacent the lower interior cooking surface and through the lengthwise interior extrusion channel. For one implementation, the conveyor is an upper conveyor having an upper endless conveyor belt, where a lower run of the upper endless conveyor belt extends lengthwise and conveys immediately adjacent the upper interior cooking surface and through the lengthwise interior extrusion channel.

For one implementation of the extrusion horn, a power source is coupled to the upper and lower cooking plates through an interface that provides energy that raises the temperature of the cooking plates and the upper and lower interior cooking surfaces. For one implementation, the interface includes, an upper induction coil positioned proximate the upper cooking plate and on an opposing side of the upper cooking plate opposite the upper interior cooking surface, and a lower induction coil positioned proximate the lower cooking plate and on an opposing side of the lower cooking plate opposite the lower interior cooking surface.

Referring to FIG. 1A, an extrusion horn apparatus 100 is illustrated. One implementation of the technology is a device including a conduit 101 communicably extending between an exit portal 106 and an entry portal 108. In one implementation, the conduit 101 can be communicable or in fluid communication between the exit portal 106 and entry portal 108 by using an internal lengthwise channel (not shown in FIG. 1) extending between and communicable with the entry portal 108 and the exit portal 106. In one implementation of the technology, the conduit 100 can have a feeder conduit portion 102 communicably extending from the exit portal 106 and communicably contacting, in-line, and end-to-end a tapered portion 104 communicably extending to the entry portal. The tapered portion 104 is of a similar configuration to that of the pre-compression nozzle 502 as illustrated in FIGS. 5 and 6. The tapered portion 104 of the conduit has an outwardly tapered end 110 and an inwardly tapered end 112 as it extend from proximate the entry and toward the exit end, where the outwardly tapered end 110 is disposed at an upstream position and abutted with respect to the inwardly tapered end 112 communicably extending toward the exit portal. The exit portal 106 is a slitted exit opening in an exit end 107 of the feeder conduit portion 102. The feeder conduit portion can be an elongated tubular structure 114. The entry portal 108 can be a slitted entry opening—See FIG. 4B.

Figure 1B:
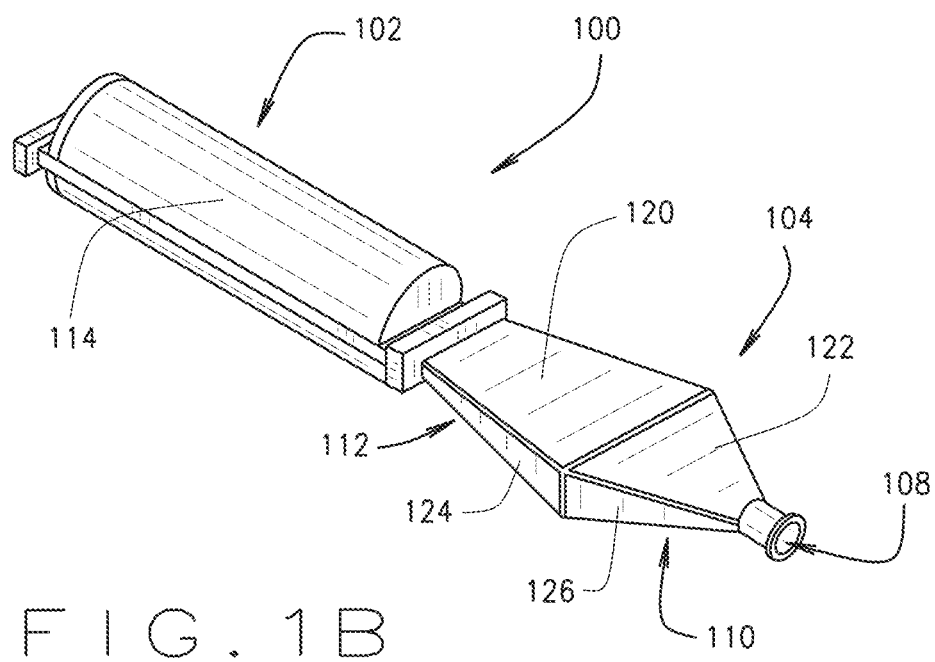
FIG. 1B is a perspective view of an extrusion horn illustrating the exit end.
Figure 2:
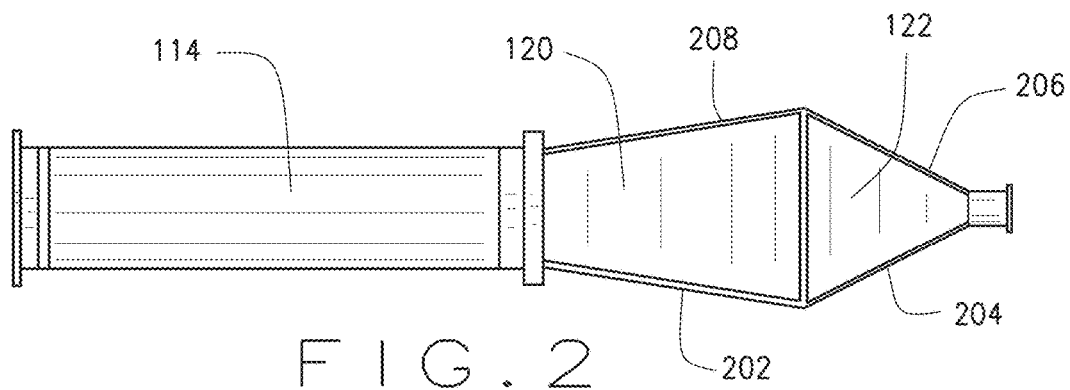
FIG. 2 is a top plan view of an extrusion horn.
Figure 3:
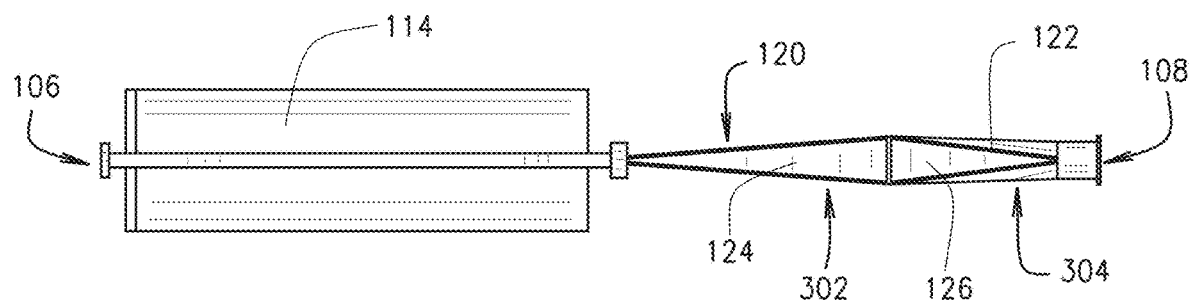
FIG. 3 is a side view of an extrusion horn.

Referring to FIG. 1B, the extrusion horn apparatus 100 having a tapered portion 104 can have an outwardly tapered end 110. The inwardly tapered end 112 of the tapered portion 104 of the conduit can include an upper outwardly tapered plate 122 and a lower outwardly tapered plate 304 (See FIG. 3) each extending downstream and tapered outwardly one with respect to the other as they extend downstream and where a distance between the upper inwardly tapered plate 122 and the lower inwardly tapered plate 304 increases as the upper inwardly tapered plate and lower inwardly tapered plate extend downstream toward the exit portal 106. Also, referring to FIG. 2 a distance between outer edges, 204 and 206 of the upper inwardly tapered plate and the lower inwardly tapered plate can increase as the upper inwardly tapered plate and the lower inwardly tapered plate extend downstream.

Referring again to FIG. 1B, the outwardly tapered end 110 of the tapered portion 104 of the conduit can include a left-side outwardly tapered plate 406 (See FIG. 4B) and a right-side outwardly tapered plate 126 each extending downstream and tapered outwardly one with respect to the other as they extend downstream and where a distance between the left-side outwardly tapered plate 126 and the right-side outwardly tapered plate 126 increases as the left-side outwardly tapered plate and the right-side outwardly tapered plate extend downstream, and where a distance between outer edges 204 and 206 of the left-side inwardly tapered plate and the right-side inwardly tapered plate increases as the left-side inwardly tapered plate and the right-side inwardly tapered plate extend downstream.

The extrusion horn apparatus 100 as disclosed and claimed, where the inwardly tapered end 112 of the tapered portion of the conduit includes an upper inwardly tapered plate 120 and a lower inwardly tapered plate 302 each extending downstream and tapered inwardly one with respect to the other where a distance between the upper inwardly tapered plate 120 and the lower inwardly tapered plate 302 decreases as the upper inwardly tapered plate and lower inwardly tapered plate extend downstream, and where a distance between outer edges of the upper inwardly tapered plate and the lower inwardly tapered plate decreases as the upper inwardly tapered plate and the lower inwardly tapered plate extend downstream. The inwardly tapered end 112 of the tapered portion of the conduit includes a left-side inwardly tapered plate 404 (See FIG. 4A) and a right-side inwardly tapered plate 124 each extending downstream and tapered inwardly one with respect to the other where a distance between the left-side inwardly tapered plate 404 and the right-side inwardly tapered plate 124 decreases as the left-side inwardly tapered plate and the right-side inwardly tapered plate extend downstream, and where a distance between outer edges of the left-side inwardly tapered plate and the right-side inwardly tapered plate decreases as the left-side inwardly tapered plate and the right-side inwardly tapered plate extend downstream.

For one implementation of the technology, the tapered portion 104 can also act as a cooking portion that sears the extrudate as it passes through. The tapered portion 104 can also be configured as a heating element that when powered can sear the extrudate as it passes through. The tapered geometry of horn makes the meat extrudate flow out uniformly without blowouts by providing back pressure. The extrudate can be pushed through to the tapered end acting as a heat transfer device having upper plate and lower plate and side plates thereby searing meat on top and bottom and all sides of the extrudate. The partially cook outside of the extrudate, for example a meat product, helps to maintain the product intact. Any marinate or seasoning applied to the product also gets cooked and seared to the product. Partial cooking on the fly is provided during extrusion.

Figure 4A:
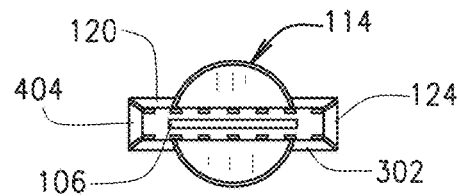
FIG. 4A is an entry end plan view of an extrusion horn illustrating the entry end.
Figure 4B:
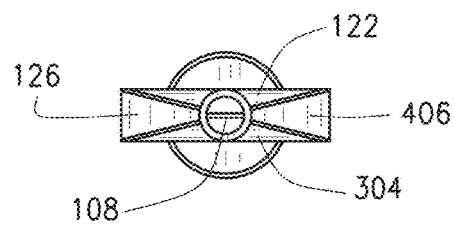
FIG. 4B is an exit end plan view of an extrusion horn illustrating the exit end.
Figure 4C:
FIG. 4C is a side view of the upper inwardly tapered plate.
Figure 4D:
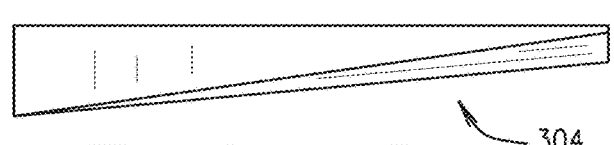
FIG. 4D is a side view of the lower inwardly tapered plate.
Figures 4E, 4F, 4G:
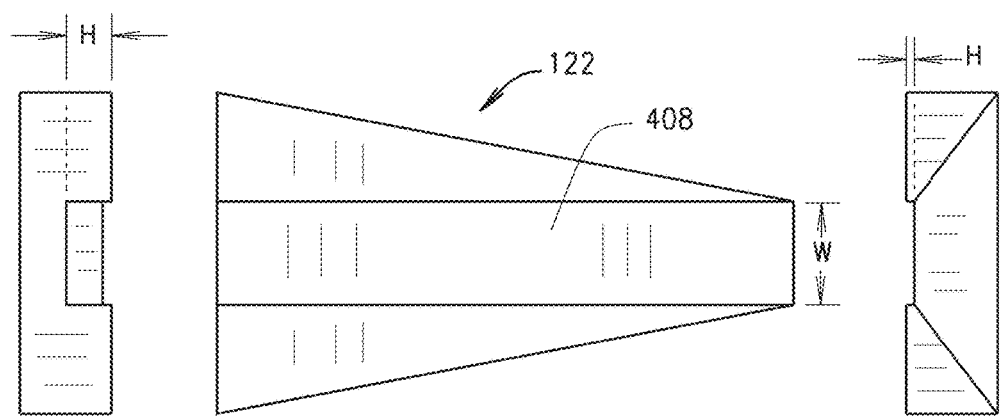
FIG. 4E is an entry end view of the upper inwardly tapered plate.
FIG. 4F is bottom view of the upper inwardly tapered plate illustrating the internal channel.
FIG. 4G is an exit end view of the upper inwardly tapered plate.

Referring to FIGS. 4C and 4D, for one implementation the upper outwardly tapered plate 122 and the lower outwardly tapered plate 304 are illustrated. The upper and lower outwardly tapered plates 122 and 304 define an internal lengthwise channel through which extrudate flows. FIG. 4F illustrates a bottom view of the upper outwardly tapered plate, which reveals the upper portion 408 of the internal lengthwise channel. A complimentary lower portion of the internal lengthwise channel is comparably defined by the lower outwardly tapered plate 304. FIGS. 4E and 4G are illustrative of the taper of the internal lengthwise channel, as the upper portion of the entry end into the channel, as seen in FIG. 4E, has a greater height than the height of the upper portion of the exit end as seen in FIG. 4G.

The portion 110 of the internal lengthwise channel extending through the outwardly tapered end progressively increases in height ("H") such that this portion of the internal lengthwise channel is outwardly tapered. Whereas, for one implementation, the portion 112 of the lengthwise channel extending through the inwardly tapered end progressively decreases in height thereby causing back pressure to provide for uniform flow of the extrudate. For example, the internal lengthwise channel can decrease in height in the range of about approximately 0.125 inches from the entry end to the exit end. However, the slope of the taper can be adjusted depending on the pressure and the consistency of the extrudate. For example, the decrease in height from entry end to the exit end can be a decrease in height in a range from approximately 0.125 inches and 0.2 inches. Again, this can vary depending on the desired back pressure and the consistency of the extrudate. In one implementation of the technology as disclosed the width ("W") of the internal lengthwise channel is uniform. The width ("W") of the channel can be designed based on the consistency and other characteristics of the extrudate. For yet another implementation the width of the channel is tapered consistent with the tapers of opposing side walls 126 and 406 and opposing side walls 124 and 404. For example for some extrudate, the width of the channel can be in the range of 1-20 inches or possibly wider for other types of extrudates. The height ("H") of the channel can be in the range of about approximately 0.125-2 inches.

Figure 4H:
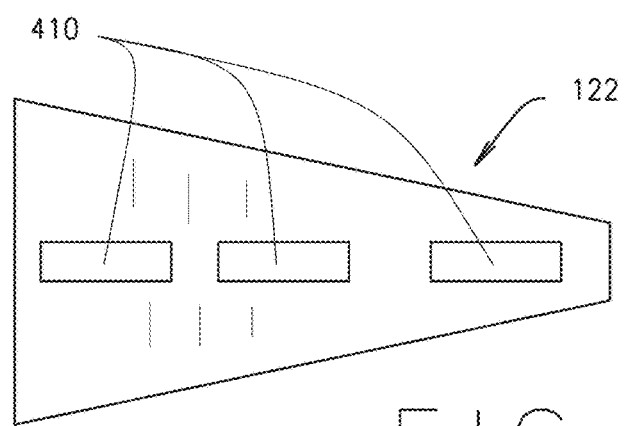
FIG. 4H is a sectional view of the upper inwardly tapered plate illustrating zones of the heat exchange jacket.

Referring to FIG. 4H, a sectional view of the upper outwardly tapered plate, illustrates the zones 410 of the heat exchange jacket, which provide the energy for searing the extrudate. One implementation of the heat exchange jacket can utilized pressurized steam injected into the zones thereby transferring heat to the inner wall of the internal lengthwise channel that is sufficient to sear the extrudate. The heat exchange can also be powered by heated fluids, electrically powered heating elements and the like. The inner wall of the internal lengthwise channel that contacts the extrudate and sears the extrudate when energized (See FIG. 4F, which illustrates the upper portion 408 of the internal lengthwise channel and reveals the inner wall) can have a non-stick surface finish and/or a non-stick coating applied to the inner wall. For example, polytetrafluoroethylene (PTFE), often sold under the brand name "TEFLON"®, can be applied or a ceramic coating, silicone coating or an enameled cast iron coating. Also, a highly polished stainless steel, anodized aluminum or a seasoned cast iron surface can be utilized. Also, non-stick fabrics that are replaceable can be utilized over the inner wall cooking surface such as for example, PTFE coated fabrics can be utilized. A non-stick fabric can be periodically replaced as a wear item.

The various implementations provided herein illustrate and extrusion horn, which provides sufficient back pressure on the extrudate and sears the extrudate as it passes through. A user of the present technology may choose any of the above extrusion horn implementations, or an equivalent thereof, depending upon the desired application. In this regard, it is recognized that various forms of the subject extrusion horn could be utilized without departing from the scope of the present invention. The technology as disclosed and claimed herein can be utilized for various protein based extrudate products, such as chicken breasts or tenders, or any animal or plant based protein items. The product can also be a ground meat product or meat batter or other food extrudate that can be formed into a final product having a particular shape or form factor after being extruded through the tapered horn device and subsequently placed in a bag that is vacuum sealed or other casing.

As is evident from the foregoing description, certain aspects of the present implementation are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present implementation. Accordingly, the specification and drawings are to be regarded in an illustrative rather than a restrictive sense. The upper and lower plates are gradually inwardly sloped one with respect to the other. The upper and lower plates are laterally sealed with spacer gaskets, which extend lengthwise along the outer lateral edges of the upper and lower cooking plates such that spacer gaskets laterally seal the upper and lower plates as the upper plate and the lower plate slope inwardly one with respect to the other, thereby having a graduated narrowing in thickness or height (narrowing spacing between the upper and the lower plate) from the entry portal to the exit portal.

Certain systems, apparatus, applications or processes are described herein and these systems, apparatus and application can include a number of modules. A module may be a unit of distinct functionality that may be presented in software, hardware, or combinations thereof that control the extrudate process such as controlling the pressure input, cooking temperature and other parameter. When the functionality of a module is performed in any part through software, the module includes a computer-readable medium. The modules may be regarded as being communicatively coupled. The inventive subject matter may be represented in a variety of different implementations of which there are many possible permutations. For example, the flow of extrudate and the rate of flow can be programmed and controlled by a computing device. The turning on and off of the heater element function of the tapered end and the heating element temperature can be controlled by a computing device.

The methods described herein do not have to be executed in the order described, or in any particular order. Moreover, various activities described with respect to the methods identified herein can be executed in serial or parallel fashion.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separate embodiment.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine or computing device. Further, while only a single machine is illustrated, the term "machine" shall also be taken to include any collection of machines that individually or jointly execute a set (or multiple sets) of instructions to perform any one or more of the methodologies discussed herein. In the case of the present technology, the extrusion horn can be a machine that is operated on an automated network. The flow of the extrudate can be controlled on the network, the partial cooking and other functionality.

If a computer system is utilized to control the extrusion horn operation, the computer system can include a processor (e.g., a central processing unit (CPU) a graphics processing unit (GPU) or both), a main memory and a static memory, which communicate with each other via a bus. The computer system may further include a video/graphical display unit (e.g., a liquid crystal display (LCD) or a cathode ray tube (CRT)). The computer system and any client computing devices can also include an alphanumeric input device (e.g., a keyboard), a cursor control device (e.g., a mouse), a drive unit, a signal generation device (e.g., a speaker) and a network interface device.

Other aspects, objects and advantages of the present invention can be obtained from a study of the drawings, the disclosure and the appended claims.

What is claimed is:

1. An extrusion horn apparatus comprising:
    a conduit communicably extending between an entry portal and an exit portal, where said conduit having a feeder conduit portion communicably extending from the exit portal and communicably contacting in-line end-to-end a tapered portion communicably extending to the entry portal,
    where the tapered portion of the conduit has an outwardly tapered end and an inwardly tapered end where the outwardly tapered end is disposed at an upstream position and abutted with respect to the inwardly tapered end communicably extending toward the exit portal, and
    where the outwardly tapered end of the tapered portion of the conduit proximate the inlet portal includes an upper outwardly tapered plate and a lower outwardly tapered plate each extending downstream and tapered outwardly one with respect to the other where a distance between the upper outwardly tapered plate and the lower outwardly tapered plate increases as the upper outwardly tapered plate and lower outwardly tapered plate extend downstream, and where a distance between outer edges of the upper outwardly tapered plate and the lower outwardly tapered plate increases as the upper outwardly tapered plate and the lower outwardly tapered plate extend downstream.

2. The extrusion horn apparatus as recited in claim 1, where the outwardly tapered end of the tapered portion of the conduit includes a left-side outwardly tapered plate and a right-side outwardly tapered plate each extending downstream and tapered outwardly one with respect to the other where a distance between the left-side outwardly tapered plate and the right-side outwardly tapered plate increases as the left-side outwardly tapered plate and the right-side outwardly tapered plate extend downstream, and where a distance between outer edges of the left-side outwardly tapered plate and the right-side outwardly tapered plate increases as the left-side outwardly tapered plate and the right-side outwardly tapered plate extend downstream.

3. The extrusion horn apparatus as recited in claim 1, where the exit portal is a slitted exit opening in an exit end of the feeder conduit portion.

4. The extrusion horn apparatus as recited in claim 1, where the feeder conduit portion is an elongated tubular structure.

5. The extrusion horn apparatus as recited in claim 1, where the entry portal is a slitted entry opening.

6. The extrusion horn apparatus as recited in claim 1, where the inwardly tapered end of the tapered portion of the conduit includes an upper inwardly tapered plate and a lower inwardly tapered plate each extending downstream and tapered inwardly one with respect to the other where a distance between the upper inwardly tapered plate and the lower inwardly tapered plate decreases as the upper inwardly tapered plate and lower inwardly tapered plate extend downstream, and where a distance between outer edges of the upper inwardly tapered plate and the lower inwardly tapered plate decreases as the upper inwardly tapered plate and the lower inwardly tapered plate extend downstream.

7. The extrusion horn apparatus as recited in claim 6, where the inwardly tapered end of the tapered portion of the conduit includes a left-side inwardly tapered plate and a right-side inwardly tapered plate each extending downstream and tapered inwardly one with respect to the other where a distance between the left-side inwardly tapered plate and the right-side inwardly tapered plate decreases as the left-side inwardly tapered plate and the right-side inwardly tapered plate extend downstream, and where a distance between outer edges of the left-side inwardly tapered plate and the right-side inwardly tapered plate decreases as the left-side inwardly tapered plate and the right-side inwardly tapered plate extend downstream.

8. A method of extruding extrudate through an extrusion horn comprising:

extruding and an extrudate through a conduit communicably extending between an entry portal and an exit portal, by extruding the extrudate through a feeder conduit portion of the conduit communicably extending from the exit portal and communicably contacting with an in-line end-to-end relationship to a tapered portion communicably extending to the entry portal, and further extruding the extrudate through the tapered portion, where the tapered portion of the conduit has an outwardly tapered end and an inwardly tapered end where the outwardly tapered end is disposed at an upstream position and abutting with respect to the inwardly tapered end thereby providing back pressure against the extrudate to improve uniform flow, and where the outwardly tapered end of the tapered portion of the conduit proximate the inlet portal includes an upper outwardly tapered plate and a lower outwardly tapered plate each extending downstream and tapered outwardly one with respect to the other where a distance between the upper outwardly tapered plate and the lower outwardly tapered plate increases as the upper outwardly tapered plate and lower outwardly tapered plate extend downstream, and where a distance between outer edges of the upper outwardly tapered plate and the lower outwardly tapered plate increases as the upper outwardly tapered plate and the lower outwardly tapered plate extend downstream.

9. The method of extruding extrudate as recited in claim 8, where the outwardly tapered end of the tapered portion of the conduit includes a left-side outwardly tapered plate and a right-side outwardly tapered plate each extending downstream and tapered outwardly one with respect to the other where a distance between the left-side outwardly tapered plate and the right-side outwardly tapered plate increases as the left-side outwardly tapered plate and the right-side outwardly tapered plate extend downstream, and where a distance between outer edges of the left-side outwardly tapered plate and the right-side outwardly tapered plate increases as the left-side outwardly tapered plate and the right-side outwardly tapered plate extend downstream.

10. The method of extruding as recited in claim 8, where the exit portal is a slitted exit opening in an exit end of the feeder conduit portion.

11. The method of extruding as recited in claim 8, where the feeder conduit portion is an elongated tubular structure.

12. The method of extruding as recited in claim 8, where the entry portal is a slitted entry opening.

13. The method of extruding as recited in claim 8, where the inwardly tapered end of the tapered portion of the conduit includes an upper inwardly tapered plate and a lower inwardly tapered plate each extending downstream and tapered inwardly one with respect to the other where a distance between the upper inwardly tapered plate and the lower inwardly tapered plate decreases as the upper inwardly tapered plate and lower inwardly tapered plate extend downstream, and where a distance between outer edges of the upper inwardly tapered plate and the lower inwardly tapered plate decreases as the upper inwardly tapered plate and the lower inwardly tapered plate extend downstream.

14. The method of extruding as recited in claim 13, where the inwardly tapered end of the tapered portion of the conduit includes a left-side inwardly tapered plate and a right-side inwardly tapered plate each extending downstream and tapered inwardly one with respect to the other where a distance between the left-side inwardly tapered plate and the right-side inwardly tapered plate decreases as the left-side inwardly tapered plate and the right-side inwardly tapered plate extend downstream, and where a distance between outer edges of the left-side inwardly tapered plate and the right-side inwardly tapered plate decreases as the left-side inwardly tapered plate and the right-side inwardly tapered plate extend downstream.

* * * * *